United States Patent
Pardo-Castellote et al.

(10) Patent No.: US 8,150,988 B2
(45) Date of Patent: Apr. 3, 2012

(54) REAL-TIME PUBLISH-SUBSCRIBE SYSTEM

(75) Inventors: Gerardo Pardo-Castellote, Palo Alto, CA (US); Mark Hamilton, San Jose, CA (US); Stefaan Sonck Thiebaut, Berlin (DE)

(73) Assignee: Real-Time Innovations, Inc., Sunnyvale, CA (US)

( * ) Notice: Subject to any disclaimer, the term of this patent is extended or adjusted under 35 U.S.C. 154(b) by 0 days.

(21) Appl. No.: 12/965,589

(22) Filed: Dec. 10, 2010

(65) Prior Publication Data

US 2011/0185074 A1 Jul. 28, 2011

Related U.S. Application Data

(63) Continuation of application No. 10/118,470, filed on Apr. 5, 2002, now Pat. No. 7,882,253.

(60) Provisional application No. 60/282,321, filed on Apr. 5, 2001, now abandoned.

(51) Int. Cl.
G06F 15/16 (2006.01)
G06F 15/173 (2006.01)
G06F 3/00 (2006.01)

(52) U.S. Cl. .................. 709/230; 709/224; 719/315

(58) Field of Classification Search .......... 709/223–224, 709/230; 715/736
See application file for complete search history.

(56) References Cited

U.S. PATENT DOCUMENTS

| | | | |
|---|---|---|---|
| 4,484,294 A | 11/1984 | Noss | |
| 4,568,866 A | 2/1986 | Floro et al. | |
| 4,796,179 A | 1/1989 | Lehman et al. | |
| 5,055,755 A | 10/1991 | Ozawa et al. | |
| 5,086,385 A | 2/1992 | Launey et al. | |
| 5,404,288 A | 4/1995 | McDunn | |
| 5,546,301 A | 8/1996 | Agrawal et al. | |
| 5,668,998 A | 9/1997 | Mason et al. | |
| 5,838,563 A | 11/1998 | Dove et al. | |
| 5,940,827 A * | 8/1999 | Hapner et al. | 707/703 |
| 5,971,581 A | 10/1999 | Gretta et al. | |
| 6,026,352 A | 2/2000 | Burns et al. | |
| 6,058,445 A * | 5/2000 | Chari et al. | 710/302 |
| 6,076,952 A | 6/2000 | Gretta et al. | |
| 6,101,419 A | 8/2000 | Kennedy et al. | |
| 6,106,569 A | 8/2000 | Bohrer et al. | |
| 6,119,125 A | 9/2000 | Gloudeman et al. | |
| 6,134,706 A | 10/2000 | Carey et al. | |
| 6,154,680 A | 11/2000 | White et al. | |
| 6,195,591 B1 | 2/2001 | Nixon et al. | |
| 6,226,788 B1 * | 5/2001 | Schoening et al. | 717/107 |
| 6,226,792 B1 | 5/2001 | Goiffon et al. | |

(Continued)

OTHER PUBLICATIONS

U.S. Appl. No. 11/379,986, filed Apr. 24, 2006.

(Continued)

*Primary Examiner* — Peling Shaw
(74) *Attorney, Agent, or Firm* — Beyer Law Group LLP

(57) ABSTRACT

A real-time protocol for real-time network programming applications is disclosed. The protocol is executable on a computer network having a plurality of nodes that include applications, a network stack, an operating system, and middleware capable of executing real-time operations. The protocol can use group objects to model physical and logical devices connected to the network wherein each group object comprises at least one variable. Changes in these variables are encapsulated in variable change messages which are propagated in the network using communication objects. Also described is a real-time messaging format useful for implementing the protocol.

15 Claims, 32 Drawing Sheets

U.S. PATENT DOCUMENTS

| | | | |
|---|---|---|---|
| 6,259,958 B1 | | 7/2001 | Steinman et al. |
| 6,269,396 B1 | * | 7/2001 | Shah et al. ............ 709/223 |
| 6,425,119 B1 | | 7/2002 | Jones et al. |
| 6,477,439 B1 | | 11/2002 | Bernaden, III et al. |
| 6,493,740 B1 | | 12/2002 | Lomax |
| 6,725,446 B1 | * | 4/2004 | Hahn et al. ............ 717/103 |
| 6,751,663 B1 | * | 6/2004 | Farrell et al. ............ 709/224 |
| 7,117,245 B1 | | 10/2006 | Levkoff et al. |
| 7,123,142 B2 | | 10/2006 | Bohbot et al. |
| 7,353,279 B2 | | 4/2008 | Curvasula et al. |
| 7,424,549 B2 | | 9/2008 | Beckwith |
| 2002/0101860 A1 | | 8/2002 | Thornton et al. |
| 2003/0005117 A1 | | 1/2003 | Kang et al. |
| 2003/0037177 A1 | | 2/2003 | Sutton et al. |
| 2003/0105800 A1 | | 6/2003 | Cullen |
| 2003/0135644 A1 | | 7/2003 | Barrett |
| 2003/0195959 A1 | | 10/2003 | Labadie et al. |
| 2003/0200315 A1 | | 10/2003 | Goldenberg et al. |
| 2003/0229786 A1 | | 12/2003 | Hollis et al. |
| 2003/0229900 A1 | | 12/2003 | Reisman |
| 2004/0024943 A1 | | 2/2004 | Lupien et al. |
| 2004/0059819 A1 | | 3/2004 | Hardcastle |
| 2004/0064553 A1 | * | 4/2004 | Kjellberg ............ 709/224 |
| 2004/0205206 A1 | | 10/2004 | Naik et al. |
| 2005/0049934 A1 | | 3/2005 | Nakayama et al. |
| 2005/0053060 A1 | | 3/2005 | Pettey |
| 2005/0218739 A1 | | 10/2005 | Maddin et al. |
| 2006/0002388 A1 | | 1/2006 | Grebus et al. |
| 2006/0095765 A1 | | 5/2006 | Pessach |
| 2006/0133313 A1 | | 6/2006 | You et al. |
| 2006/0251055 A1 | | 11/2006 | Monette et al. |
| 2007/0016637 A1 | | 1/2007 | Brawn et al. |

OTHER PUBLICATIONS

U.S. Appl. No. 11/410,563, filed Apr. 24, 2006.
U.S. Appl. No. 11/410,511, filed Apr. 24, 2006.
Taylor, Object-Oriented Information Systems Planning and Implementation, pp. 1-172, 215-282, Apr. 10, 1992.
Rational Rose, Using Rational Rose 4.0, Rational Software Corporation, pp. 1-219, Nov. 1996.
Quatrani, Terry,Visual Modeling with Rational Rose and UML, pp. 1-6, Third Printing Apr. 1998.
Object Management Group (OMG), "Data Distribution Service for Real-Time Systems Specification," Version 1.1, Dec. 2005.
Case et al., A Simple Network Management Protocol (SNMP), May 1990, IEFT, RFC 1157, pp. 2, 6-8, 10, 12, 16, 19-20, 25, 27.
McCloghrie et al., Management Information Base for Network Management of TCP/IP-based internets, Aug. 1988, IETF, RFC 1066, pp. 10-11.
Rose et al., Structure and Identification of Management Information for TCP/IP-based internets, Aug. 1988, IETF, RFC 1065, pp. 7-8, 10.
Information Sciences Institute, USC, Internet Protocol, Sep. 1981, IEFT, RFC 791, pp. 11.
Postel, J., User Datagram Protocol, Aug. 28, 1980, IETF, RFC 768, pp. 1.
UML Booch & Omt, Quick Reference for Rational Rose 4.0, 1996, Rational Software Corporation, pp. 10.
Burnett et al., "Concepts and Environments—Visual Object-Oriented Programming", 1995, Manning Publications Co., pp. 276.
Firesmith et al., "Dictionary of Object Technology", Sigs Books, 1995, pp. 5.
Castellote et al., "NDDS: The Real-Time Publish-Subscribe Middleware," Proceedings of the IEEE Real-Time Systems Symposium, 1997, 11 pages.
Castellote et al., "The Network Data Delivery Service: Real-Time Data Connectivity for Distributed Control Applications," Proceedings of the International Conference on Robotics and Automation, IEEE, May 1994, 7 pages.
Office Action dated Mar. 17, 2010 from U.S. Appl. No. 11/410,511.
Notice of Allowance dated May 26, 2010 from U.S. Appl. No. 11/410,563.
Notice of Allowance dated Mar. 30, 2010 from U.S. Appl. No. 11/379,986.
Final Office Action dated Nov. 29, 2010 from U.S. Appl. No. 11/410,511.
Office Action dated May 20, 2005 from U.S. Appl. No. 10/118,470.
Final Office Action dated Nov. 15, 2005 from U.S. Appl. No. 10/118,470.
Office Action dated Sep. 15, 2006 from U.S. Appl. No. 10/118,470.
Final Office Action dated Apr. 4, 2007 from U.S. Appl. No. 10/118,470.
Office Action dated Jul. 21, 2008 from U.S. Appl. No. 10/118,470.
Final Office Action dated Aug. 20, 2009 from U.S. Appl. No. 10/118,470.
Office Action dated May 26, 2010 from U.S. Appl. No. 10/118,470.
Notice of Allowance dated Sep. 10, 2010 from U.S. Appl. No. 10/118,470.

* cited by examiner

REAL-TIME PUBLISH-SUBSCRIBE SYSTEM

CROSS REFERENCE TO RELATED APPLICATIONS

This application is a continuation of and claims priority under 35 U.S.C. §120 to U.S. patent application Ser. No. 10/118,470, filed Apr. 5, 2002, now U.S. Pat. No. 7,882,253 issued on Feb. 1, 2011, and entitled "Real-Time Publish Subscribe System," which claims priority under 35 U.S.C. §119 (e) from U.S. Provisional Patent Application No. 60/282,321 filed Apr. 5, 2001, now abandoned which are incorporated by reference herein in their entirety and for all purposes.

TECHNICAL FIELD

The invention described herein relates to network programming. In particular, the present invention pertains to the implementation of a real-time publish-subscribe (RTPS) protocol that can be used in real-time network programming applications.

BACKGROUND

A real-time system (such as a RTPS system) is defined as a system which operates within finite time boundaries. By finite time boundaries, what is meant is that responses to system queries must occur within some predictable time boundary or response time. For example, within two seconds of the query. Response within the predictable time boundary is the overriding parameter. So, the system is not real-time in the sense that transfer of information is instantaneous, but rather that the transfer of information is in accord with some set of time sensitive parameters. Thus, a real time system is not purely asynchronous nor is it strictly instantaneous. The time boundary conditions are flexible depending on the system. For example, a radar tracking system for an anti-aircraft missile requires extremely fast response time. Whereas, a mass production assembly line in a factory may require a much reduced response time on the order of tens of minutes. Both are considered real-time under the definition provided here. Examples of real-time systems can include, without limitation, command-control systems, sensor-actuator systems, network management systems, distributed real-time simulations or games, and the like.

In the field of network applications high level protocols such as DCOM, FTP, DHCP, DCE, RTP, HTTP, and CORBA have been used for constructing commercial applications. Each of these protocols fills a specific niche and are well designed for their specific purposes. However, such protocols are found to be lacking when applied to distributing data in real-time applications. Such protocols do not provide the right level of abstraction and for the most part lack certain key functionalities necessary to create and/or implement real-time applications. In particular, such protocols do not include functionalities for achieving real-time attributes such as predictable communication, time-aware decisions and notifications, operation over unreliable transports, use of multicast, transparent hot swap substitution, or time and resource aware quality of service (QoS) controls.

The publish-subscribe communications model (also referred to herein as publish/subscribe) is a new model of network programming, whereby a message sender does not explicitly specify the receiver. Instead, the sender publishes data with a topic, while receivers who are subscribing to the topic will receive the data and possibly an asynchronous notification that the data has changed. This model is quite different from the traditional request/response programming wherein an application program explicitly indicates the service it wants and synchronously waits for a return from a blocked I/O call. The publish/subscribe model has some distinct advantages over typical server/client networks. For example, there are no special server nodes. Thus, any node can send or receive information streams from any other node. As such, publish/subscribe systems reduce the amount of system overhead required for the operation of a networked system.

Publish/subscribe communications reduce network loading and simplify programming for one-to-many network communications. It reduces network loading because there is no need for request messages, and it eliminates for polling. Finally, publish/subscribe also lets a developer make use of multicast technology where one message can be sent to many receivers. Importantly, publish/subscribe simplifies network programming because publishers do not need to know where the subscribers are on the network, and subscribers do not need to know where the publishers are. Publishers simply declare a publication topic and start sending messages. Each subscriber simply declares an interest in that topic. The publish/subscribe software takes care of all the packet addressing, data marshalling (serializing), de-marshalling, and packet-sending.

The publish/subscribe model is a natural fit for the complex communications required in distributed real-time systems. However, there are limitations to ordinary publish/subscribe systems. Ordinary publish/subscribe systems do not provide the time and resource predictability, fault tolerance, robustness and data-delivery control that real time systems require.

Therefore, an improved communication protocol is needed for facilitating real-time communications in real-time computer networks and for implementing real-time network programming applications.

SUMMARY OF THE INVENTION

In accordance with the principles of the present invention, one embodiment of the present invention is a real-time protocol executable on a computer network having a plurality of nodes, wherein the nodes can include applications, a network stack, an operating system, and middleware capable of executing real-time operations. The protocol can use group objects to model physical and logical devices connected to the network wherein each group object comprises at least one variable. Changes in these variables are encapsulated in variable change messages which are propagated in the network using communication objects. The variables can be state variables which encapsulate the state of the variables and/or objects the represent. Also, the variables can include sub-variables which represent portions or aspects of the variable.

Another embodiment comprises a real-time computer architecture that includes write objects, read objects, and a message interpreter. Also, the architecture includes variable reference tables which write objects use to track variable information and remote reader reference tables for each reader so that the writer can determine a message status for each reader. In this architecture, the write object writes variable change messages to associated read objects and a message interpreter receives and interprets the variable change messages so that they can be read by the read object.

In another embodiment, the invention includes a modular message format having a RTPS message header of a uniform length. The format also includes a variable number of RTPS submessages where each RTPS submessage includes a RTPS submessage header of uniform length and a RTPS submessage payload comprised of a variable number of RTPS submessage elements. Also, the message format provides a mechanism to extend the number and types of submessages in such way that the applications using this extended submessages remain backwards compatible with applications that were not aware of these submessages. Also the format provides a way to describe variable properties, encapsulated within submessages, such that new properties can be added in the future, in such way that the applications using this additional properties remain backwards compatible with applications that were not aware of these properties.

The invention includes a method embodiment for writing variable change message from a writer to a registered reader. The method comprises determining if there is a new reader, and where there is no new reader determining if there has been a change to a variable, saving the changes, and modifying the sequence number. Where there is a new reader, a remote reader process is activated to update the reader. Also, the method provides a way to propagate changes in the order they occurred, and to indicate that a set of variable changes should be interpreted by the receiving application in a coherent (indivisible or atomic) manner (i.e. either all the changes are available to the receiving application or no changes are available to the receiving application).

The invention also includes a method embodiment for a registered reader to read variable change messages sent by a writer using the steps of determining if there is a writer for which the reader is registered to receive variable change messages and where there is a suitable writer activating a remote writer process to update the registered reader. Also, a method for determining which changes are relevant to a particular remote application, coalesce (combine) changes in a way that the overall meaning is preserved, and propagate only the changes required to reconstruct a consistent view at the receiving end.

These and other aspects and advantages of the invention will become apparent from the following detailed description and accompanying drawings which illustrate, by way of example, the principles of the invention.

BRIEF DESCRIPTION OF THE DRAWINGS

For a fuller understanding of the invention, reference is made to the accompanying drawings in the following Detailed Description. In the drawings.

Figure 1:
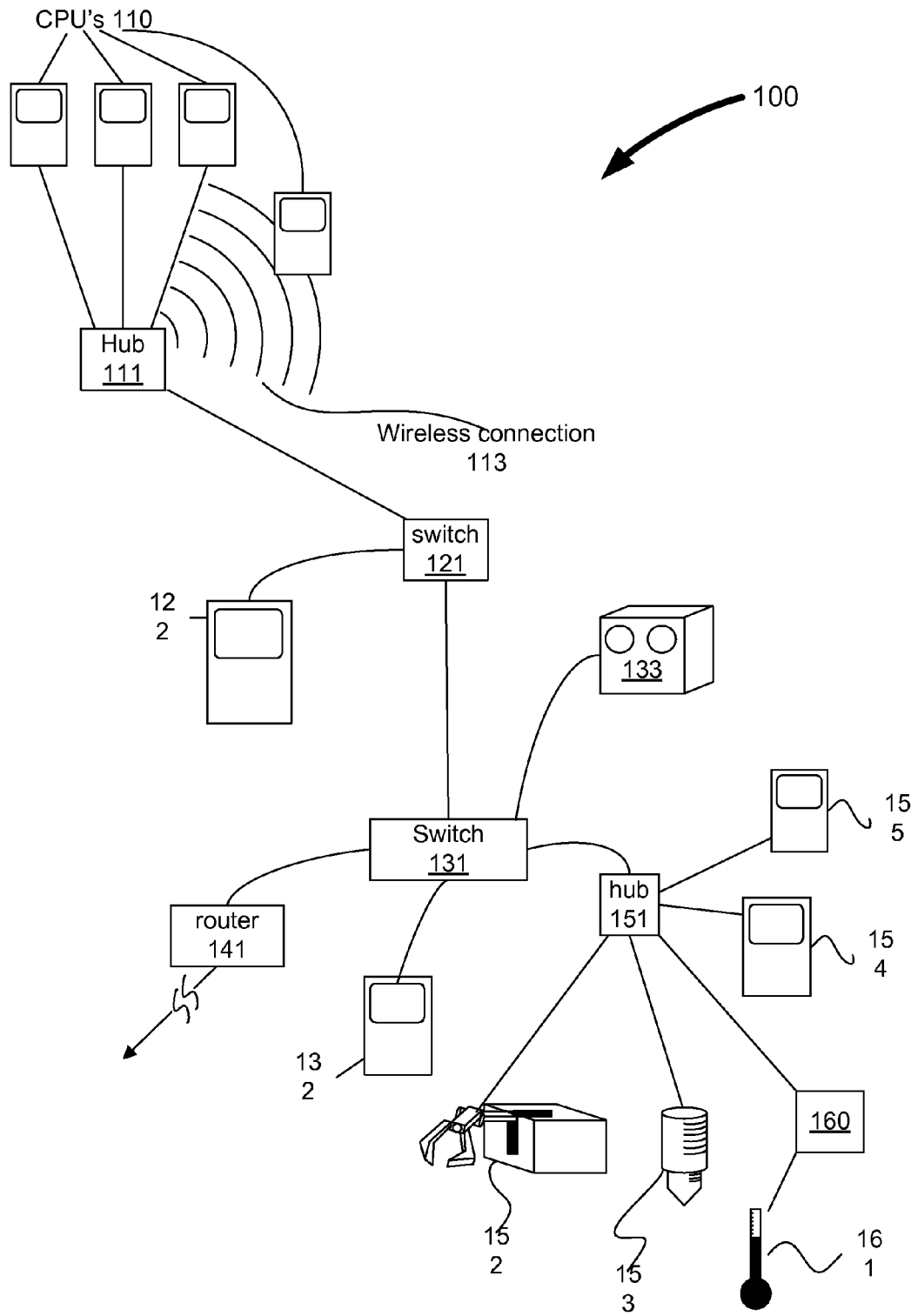
FIG. 1 is a figurative illustration depicting an embodiment of a real-time computer network in accordance with the principles of the present invention.

Reference numerals refer to the same or equivalent parts of the present invention throughout the several figures of the drawings.

DETAILED DESCRIPTION OF THE INVENTION

The present invention has been particularly shown and described with respect to certain preferred embodiments and specific features thereof. The embodiments set forth herein below are to be taken as illustrative rather than limiting. It should be readily apparent to those of ordinary skill in the art that various changes and modifications in form and detail may be made without departing from the spirit and scope of the invention.

The protocol of the present invention is a real-time publish/subscribe (RTPS) communications protocol that can be put to advantageous use in real-time applications. The RTPS protocol is more efficient than client-server protocols (e.g., DCOM or CORBA) in both latency and bandwidth, and particularly for periodic data exchange. By using subscriptions, occasional low bandwidth subscription requests replace the numerous high-bandwidth client requests, thereby substantially reducing the overhead required in a RTPS system. Latency is also reduced, as the outgoing request message time is eliminated. Additionally, a RTPS protocol is capable of supporting unicast and multicast messaging thereby supporting "many-to-many" connectivity in group subscriptions. Thus, the RTPS protocol is ideal for building reconfigurable, robust applications that can be scaled to many participating nodes. The RTPS protocol can also take advantage of multicast technology to efficiently send real-time data to many subscribers. The present RTPS protocol can support high-performance real-time communication over standard IP networks. The advantage to this type of publication is that users need not specify computer addresses, routes, port numbers or any of the other identifying information generally required with message-based communications because this information has already been sent and is cached. The publication includes the data format(s) of updates for that publication. Communications occur in three simple steps: declaration of intent to publish by an information producer, declaration of interest in the subject by an information consumer, and delivery of information produced. Each time an information producer publishes a new sample, the communication real-time RTPS middleware operating on the network automatically routes the data from the information producer to all interested information consumers.

RTPS communications are event driven. This means that whenever new data is produced, subscribers are notified and provided with the new data. The subscribers may be notified asynchronously (i.e., interrupted) or synchronously (by polling). Such data transfer is initiated by the publisher.

FIG. 1 depicts an embodiment of a distributed real-time system 100 in accordance with the principles of the invention. The distributed real-time system 100 is composed of a network of interconnected real-time computer nodes. Each node is capable of supporting real-time operations. The distributed real-time system 100 is composed of many interconnected systems including a first group of CPU's 110 that are interconnected to a bus or a network hub 111. One of the CPU's 110 is shown connected to the hub 111 using a wireless connection 113. The hub 111 is connected to a hub or a switch 121. A user interface station 122 having a graphical user interface (GUI) is connected to the switch 121. The switch 121 is connected to a switch 131. The switch 131 is connected to a router 141 which can connect the distributed real-time system 100 to other routers attached to similar networks. The switch 131 is also connected to real-time computer 132 (i.e., a computer capable of supporting real-time operations) and connected to a server 133. The switch 131 is connected to a hub 151 which is connected to a number of other real-time components. Such real-time components can include devices having on-board computing capacity. One example of a real-time component is a robot 152 with integrated CPU. Another example of a real-time component is a microprocessor-controlled pump 153. Similarly, the real-time component can be any other computer-assisted mechanical device. Other real-time components can include a real-time computer 154 or a CPU 155. The hub 151 can also be connected to node 160 which represents a real-time device capable of executing real-time software for controlling an associated temperature sensor 161.

Many other arrangements and combinations of busses, hubs, switches and routers are possible. The key aspect is the connection of all the computing elements to a network that allows messages to be exchanged.

As previously stated, distributed real-time systems 100 can be distributed over vast distances (e.g., nationwide) or over much smaller distances (e.g., throughout a factory manufacturing floor or distributed throughout a ship). In reality, the principles of the present invention may be applied to many different types of a distributed real-time systems that use any number of real-time components (and non-real-time components) interconnected in a variety of ways. In addition to physical devices, the real-time nodes of the system can include logical devices (e.g., executable software capable of conducting real-time operations with respect to devices of the system).

Figure 2:
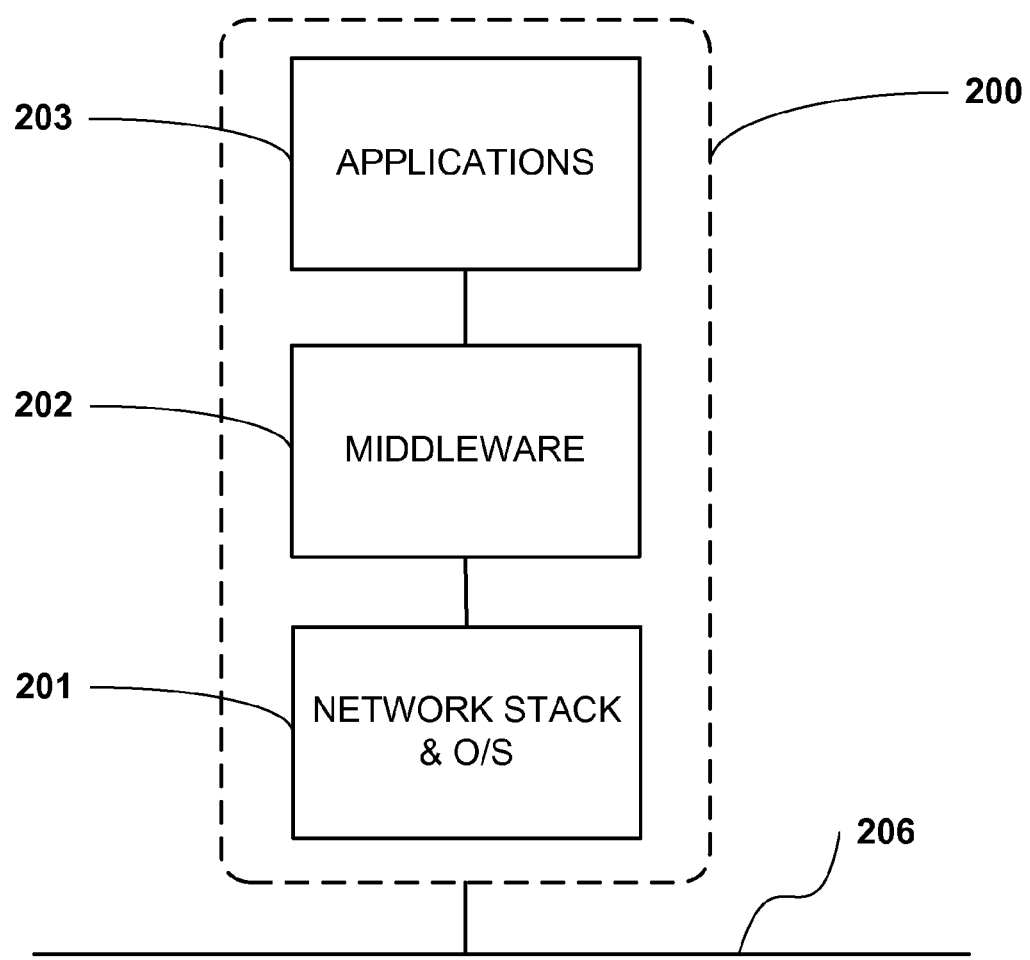
FIGS. 2 and 3 are block diagrams of an embodiments of a real-time node and a network of such nodes.

The real-time computer nodes of the distributed real-time system 100 are capable of executing real-time operations and can include, without limitation, CPU's, embedded systems, robots, sensors, or a variety of other real-time devices. FIG. 2 is a block diagram of a network node 200 suitable for use as a real-time computer node of the distributed real-time system 100. The network node 200 includes an operating system (O/S) with a network stack 201). The network node 200 also includes real-time middleware 202 and application software 203. The real-time middleware 202 (also referred to herein as just "middleware") accomplishes messaging and object management utilized to communicate with other network nodes of the distributed real-time computing system 100. The network node 200 is connected to the distributed real-time system 100 using a network connection 206. The network connection 206 can be a wired or wireless connection. In one embodiment, the network connection 206 is provided through an Ethernet™ network link. Still further, the network node 200 includes one or more applications 203. The application 203 comprising software and/or devices. The middleware 202 is in communication with the applications 203 and the O/S 201 of the network node 200. Still further, the middleware 202 of the network node 200 also communicates with like middleware resident on other network nodes within the distributed real-time system 100.

Figure 3:
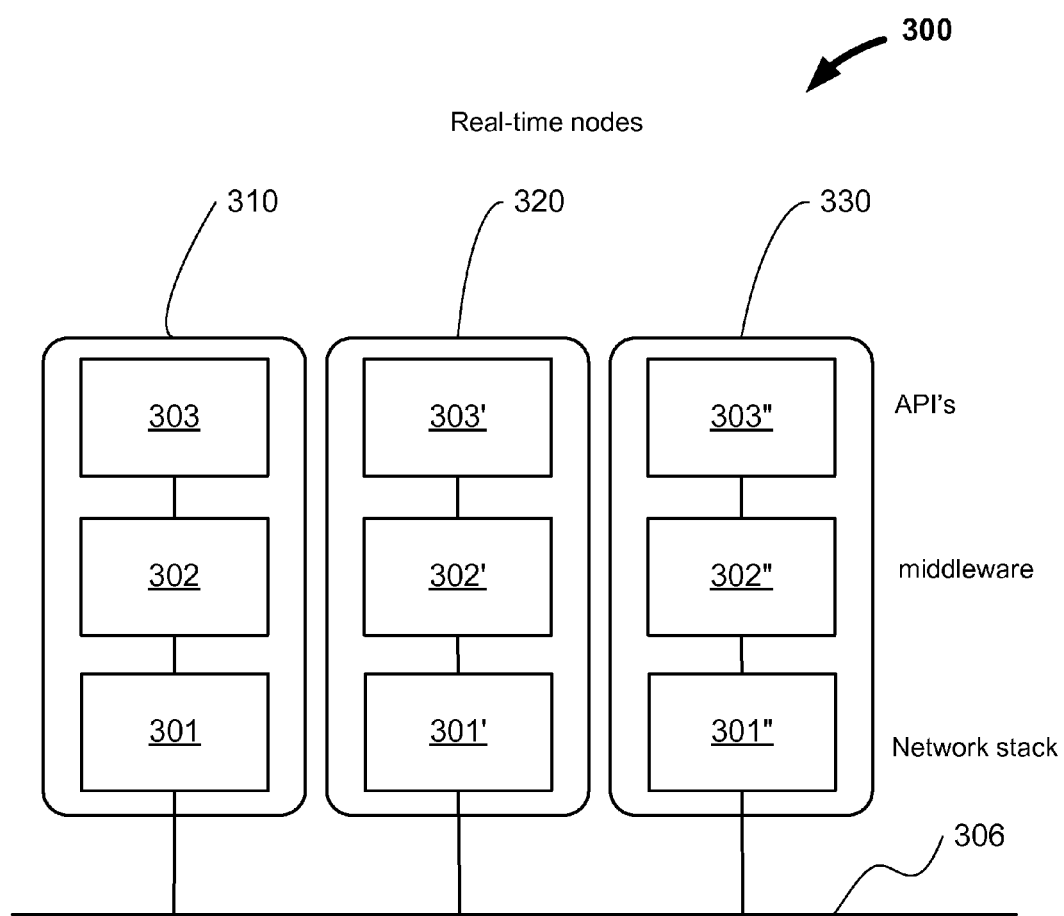

FIG. 3 is a block diagram of a simplified distributed real-time network 300 including group of real-time nodes 310, 320, and 320. As explained with respect to FIG. 1, the computer nodes (as referred to as real-time nodes) can be comprised of many real-time entities. In the example depicted in FIG. 3, real-time node 310 can be a real-time robot, real-time node 320 can be a real-time computer, and real-time node 330 can be a real-time device, for example, a temperature control device. Each of the real-time nodes 310, 320, 320 is respectively schematically illustrated showing Application Programming Interfaces (APIs) 303, 303', 303", middleware 302, 302', 302", and network stack/operating system 301, 301', 301". Here, each real-node 310, 320, 320 is respectively connected to a network backbone 306 via the network stack 301, 301', 301". The network stacks typically support network protocols like UDP. Each of the API's 303, 303', 303" can represent a plurality of applications. The API's 301, 301', 301" can be incorporated into a unified system of primarily software on a distributed real-time system. Such unified systems of software are used with most applications for distributed real-time systems. Typical examples include air-traffic control systems, factory control systems, fire control systems, as well as numerous other types of real-time systems. Importantly, the API's of any real-time node can include API's to a multitude of communication objects within the middleware which are used to facilitate real-time communications in the network. The operation and use of such communication objects is explained in later paragraphs. The middleware 302, 302', 302" is a software (and hardware) system capable of facilitating real-time communications between the various nodes and applications in a distributed real-time network.

The use of variables with group objects allows the middleware to impose more controlled behavior in the propagation of changes that affect variables within the group. As a result, the application can specify whether certain changes need to be propagated causally (i.e. in the same logical sequence as they occurred) or atomically (i.e. either all available to the application of none available to the application). Moreover, a communication object can determine cases where multiple changes to the group can be combined without affecting the interpretation by the observers, and thus limit the amount of memory and network traffic needed to communicate the state of the group to the remote observers. These capabilities are also extensively described hereinbelow.

Figure 4:
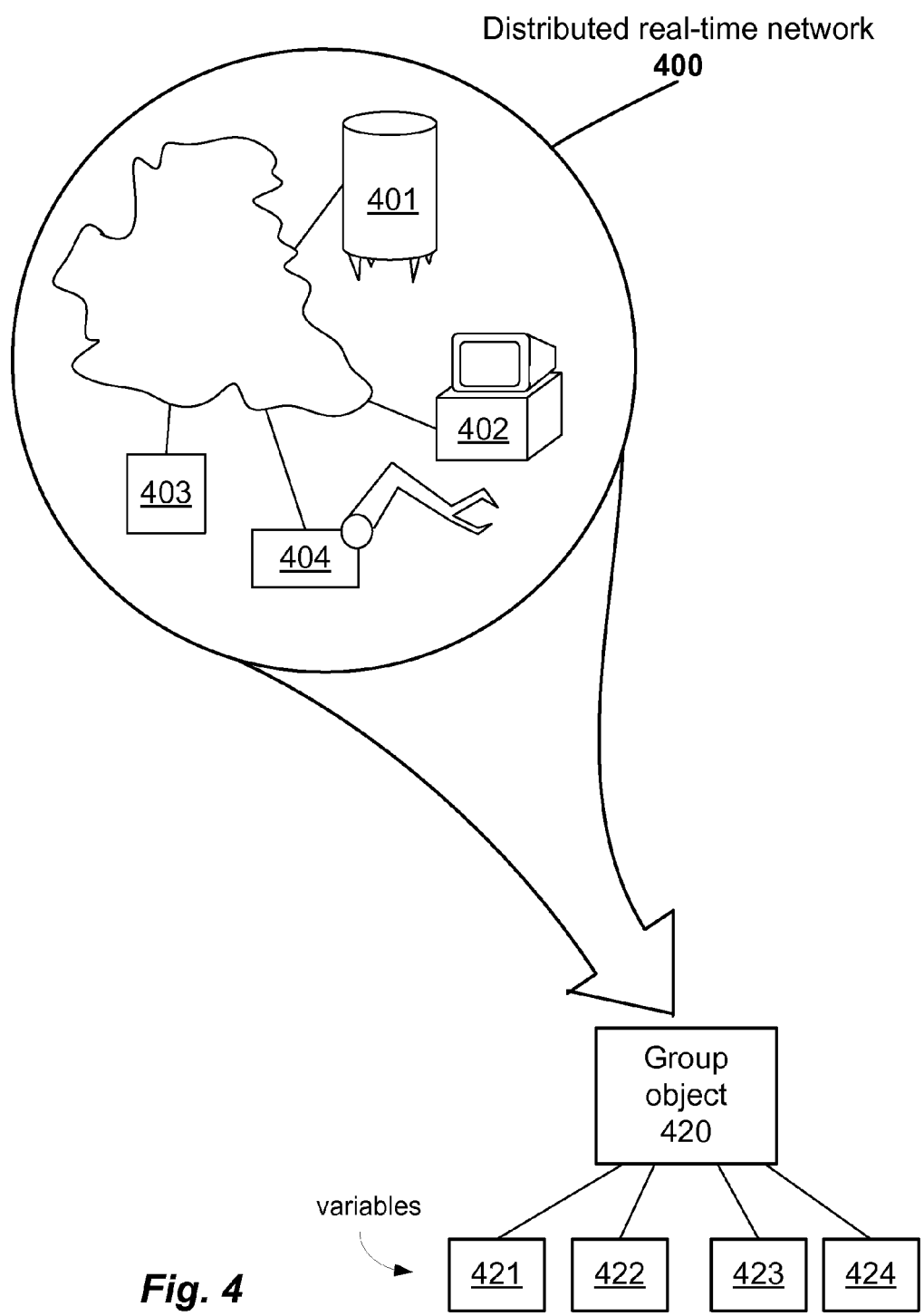
FIG. 4 is a figurative illustration of a portion of a real-time network being mapped to a group object in accordance with the principles of the present invention.

FIG. 4 depicts a mapping of a portion of a simplified, distributed real-time network 400 into a group object in accordance with one aspect of the invention. The real-time network 400 includes a number of interconnected real-time entities (devices, programs, applications, nodes, etc.) 401, 402, 403 and 404. The attributes, characteristics, data, and data values from the entities 401, 402, 403, 404 are mapped into a software construct representing the desired features of the entities 401, 402, 403, 404. This software construct uses variables 421, 422, 423, 424 to represent various aspects of the entities 401, 402, 403 and 404. The variables 421, 422, 423 and 424 can be grouped under a group object 420. The group object 420 is a generic user-defined aggregation of variables used to represent a system in an interrelated manner. The variables themselves represent states of the various entities aggregated under the group object. Accordingly, this may represent the states of subsystems or simply the values of a set of related variables, or anything else the application developer chooses to aggregate. Additionally, the group object itself is itself a variable (i.e., a group object variable) representing the values of all the variables aggregated under the group object. Additionally, each variable can include a set of sub-variables that can represent various aspects of a variable.

Figure 5:
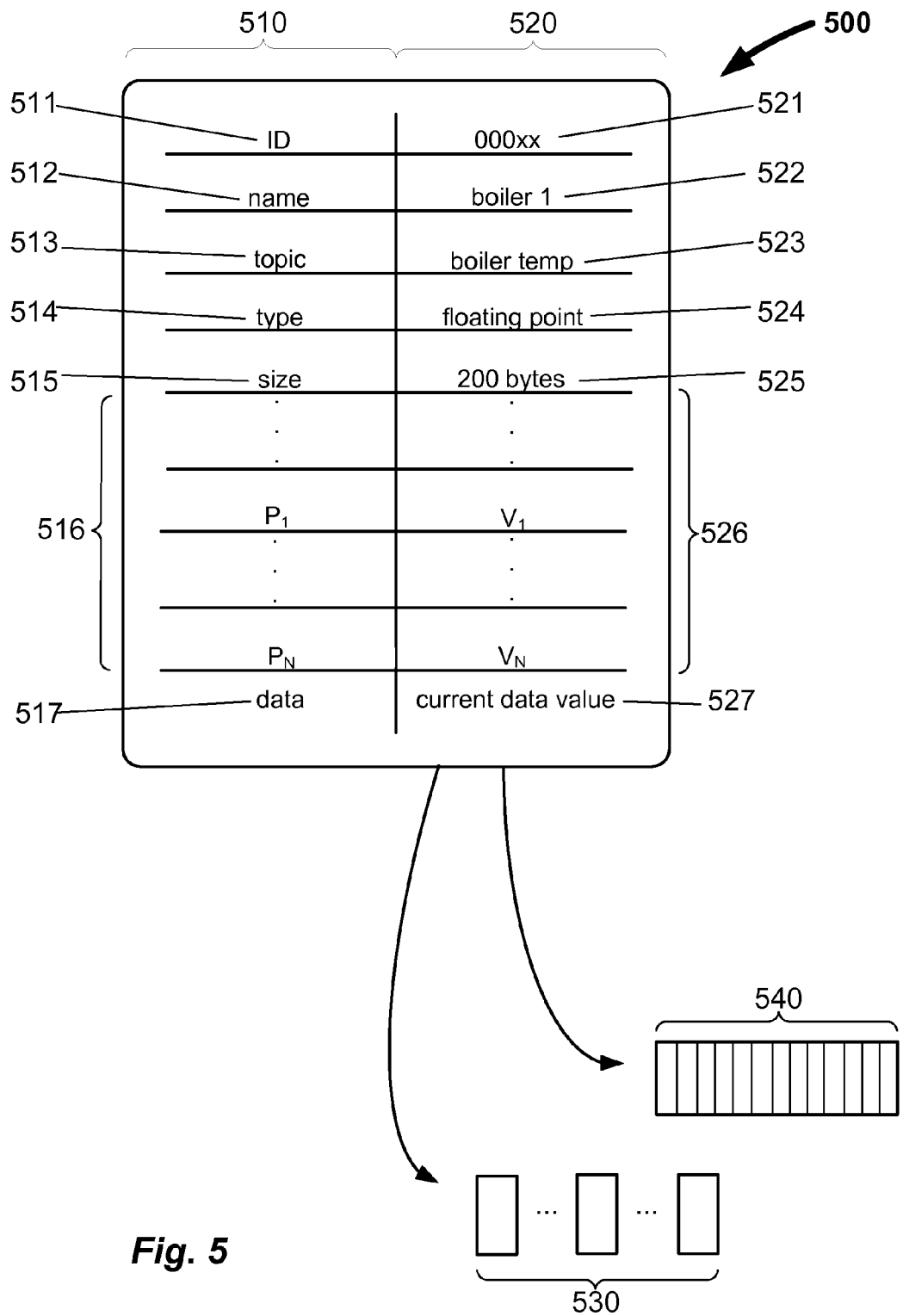
FIG. 5 is a depiction of a variable embodiment in accordance with the principles of the present invention.

FIG. 5 is schematic illustrative depiction of one embodiment of a variable 500. A variable 500 is a data object that includes a plurality of parameters 510 and a plurality of associated parameter values 520. These parameters define a set of properties that define the variable 500. For example, the variable 500 includes an identifier (ID) 511 (such as a Global Unique Object Identifier (GUID)) which has a data value 521 (shown here as 000xx) that uniquely identifies the variable 500 in question. The depicted variable 500 includes a parameter "name" 512 and a corresponding associated value 522 (shown here as "boiler 1"). Another useful parameter is "topic" 513 and its corresponding associated value 523 (shown here as "boiler temperature"). Topic information allows other objects desiring information about the same topic to get appropriate variable information. In the depicted example, the variable 500 provides temperature information concerning boiler number 1. Other parameters of the variable 500 can include, for example, "type" and "size". The "type" parameter 514 indicates the data format type for data produced by the variable 500. Here, the value 524 is depicted as floating point number. Other examples of such types include, but are not limited to, boolean, integer, array types, structured types that contain primitive types (such as integers) within, and structured types containing arrays and other structured types within. The "size" parameter 515 indicates the size of the data produced by the variable 500 (depicted here as 200 byte data). The variable 500 can include further relevant parameters (e.g., $P_1 \ldots P_N$) 516 and associated parameter values (e.g., $V_1 \ldots V_N$) 526 which define the properties of the variable 500. Variables must, at a minimum, include parameters for a GUID, a type (which may be defaulted if not explicitly stated), and a topic (which may be explicitly assigned or deduced from the way the variable is defined). Examples of such other relevant parameters include, but are not limited, to program version number, metadata about the variable, deadlines, buffers sizes, default values, QoS reliability criteria, types of configuration data, and many others. Changes to these parameters can occur infrequently and sporadically or frequently or in some cases, not at all.

Additionally, the variable 500 can include a special parameter called a data parameter 517. The data parameter 517 is associated with a data value that represents the most current value 527 of the data parameter 517 identified by the variable 500. Changes to the data value 527 can be intermittent (as shown by the intermittent change values 530) or can be a stream of sequential data values taken at regular intervals (as shown by the data stream 540). The variable 500 provides the data values 527 that are sent to the middleware of the real-time system. The middleware is configured to transmit the data values to appropriate receivers or to store the data values in memory buffers until delivered to appropriate receivers.

Other parameters can be specified that identify and characterize other variables (sub-variables) that are subordinate to the depicted variable 500. For example, a variable can have a topic identified as "boiler 1" and also have three sub-variables, each pertaining to a separate sensor reading that supplies information concerning boiler 1.

The real-time communications protocol of the present invention is structured such that it can accommodate information produced and transmitted by both group objects and by individual variables. Communications can be grouped in two generalized categories "sporadic" communications and "stream" communications.

"Sporadic" communications include messages that can represent different (and in many cases only tenuously related) data items. Some characteristics of such "sporadic" communications include messages that can have different formats, sizes, and semantics. As a consequence, successive data changes may pertain to completely different types of data. For example, if the system being modeled is an aircraft carrier, a first data message (update) can include information concerning changes to aircraft fuel status (i.e., current remaining fuel is 11,000 tons). The second data message (update) can be unrelated to fuel, for example, it can be a listing of the number and types of aircraft on the flight deck and ready for takeoff. Additionally, such sporadic messages can reflect changes in certain parameters of a variable. Another characteristic of such "sporadic" communication is that the messages can be sent at irregular time intervals, rather than periodically or in a continuous stream of data updates. In "sporadic" communications, data is generally sent only when there are changes to the preexisting "state" of some data item. As a result, "reliable" message delivery is frequently required in order to ensure that the receiver actually receives the message. Thus, reliability is an important QoS parameter for "sporadic" communications. Such "reliable" messages are generally transmitted requiring the receiver to acknowledge receipt of the message. This may in some case require the system to store a certain backlog of messages until receipt of the message is acknowledged. In the present invention "sporadic" communications can optionally invoke the capability of maintaining the updates in a coherent logical order. This means that the receiver, if desired, can receive the messages in the order that the changes occurred even if the changes occurred to different data items. The invention also enables applications to group a set of changes into indivisible units so that receiving applications can view the entire set of changes, or none of the changes in the set.

Sporadic communications can easily accommodate data transmission concerning group objects. The details of how the real-time protocol of the present invention facilitates such sporadic communications will be described in greater detail hereinbelow.

Another type of data communication uses "stream-based" communications. "Stream-based" communications include message streams of successive messages that have the same (or similar) format and size. Examples of such messages are data values pertaining to a data parameter. In such message streams, the format is identical (or selected from a small, well defined, set of formats and message sizes). Also, stream-based messages have similar semantics. For example, the messages may include data information that includes different data values, but all the data values pertain to the same data item. For example, the data information can relate to a temperature sensor reading (in degrees C.), but each successive data value can represent a different value for the temperature. Characteristically, stream-based communications are often repetitive or periodic in nature (e.g., a stream of stock prices over time, or a series of pressure readings from a pressure sensor taken at periodic intervals). Due to the repetitive or periodic nature of most stream-based messages, the message receiver is frequently interested in only the current value of the message stream. As a result, "best efforts" message delivery is frequently a sufficient quality of service (QoS) parameter. Such "best efforts" messages are commonly transmitted without the need for the receiver to acknowledge receipt of the message. Such "stream-based" messaging can be thought of as a simplified and less complicated version of the aforementioned "sporadic" communications. The details of how the real-time protocol of the present invention facilitates such stream-based communications will be described in greater detail hereinbelow.

Changes in the state of group objects and/or state variables are transmitted to appropriate receivers of these changes using specialized communication objects. These communication objects include "read objects" (which can include Readers and Subscribers which are collectively referred to herein as "Readers") and "write objects" (which can include Writers and Publishers which are collectively referred to herein as "Writers"). The operation of these Readers and Writers is explained in later paragraphs.

As soon as a new application or device or other entity is connected to a network, Readers and Writers are generated that correspond to that new application or device or other entity. Writers are generated to communicate (or publish) information having certain topics to the rest of the network. Readers are generated by applications or devices or other entities that wish to receive (or subscribe to) information having a desired topic or attributes matching that of the Writers.

Figure 6:
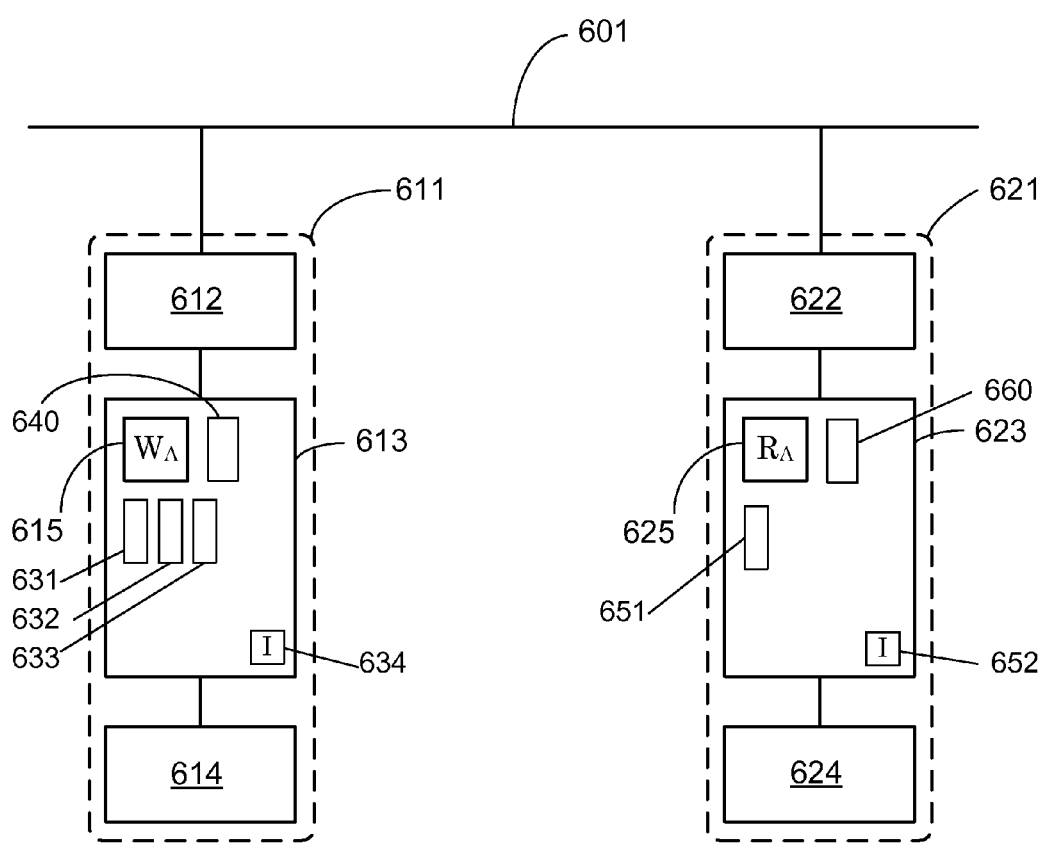
FIG. 6 is a depiction of an embodiment of a real-time communication architecture in accordance with the principles of the present invention.

FIG. 6 is a simplified depiction of a portion of a real-time network according to one embodiment. A first entity 611 includes a network stack and O/S 612, middleware 613, and application 614. A second entity 621 also includes a network stack and O/S 622, middleware 623, and application 624. The first entity 611 and the second entity 621 are interconnected using network connection 601. In the depicted example, the middleware 613 of the first entity 611 includes a writer ($W_A$) 615. This writer 615 is associated with a variable having a topic A. The middleware 623 of the second entity 621 includes a reader ($R_A$) 625. The writer can also be referred to as a write communication object (write object), and the reader can also be referred to as a read communication object (read object). The read object 625 desires information concerning topic A and thus is also associated with write object 615. It is to be noted that each application or device or other entity connected to the network can have many different reader objects and write objects. Thus, for each writer 615, the middleware 613 has associated with it a variable reference table 631 which is used to track variable information concerning the writer 615. Also included in the middleware 613 and associated with the writer 615 are remote reader reference tables 632, 633 for each reader that has registered to receive information from the writer 615. The middleware 613 also includes a remote reader 640 associated with each reader 625 registered to receive information from the writer 615. The remote reader 640 receives messages sent to the writer 615 from its associated reader 625. Correspondingly, the middleware 623 associated with the reader 625 includes, a variable reference table 651 which is used to track received variable information. Also, the middleware 623 associated with the reader 625 includes a remote writer 660 that can send messages to the writer 615 from the reader 625. In short, when writer 615 produces data concerning variable A, such data is published by the middleware 613. All readers 625 registered to receive information produced by the writer 615 then receive the information concerning the variable A.

Figure 7A:
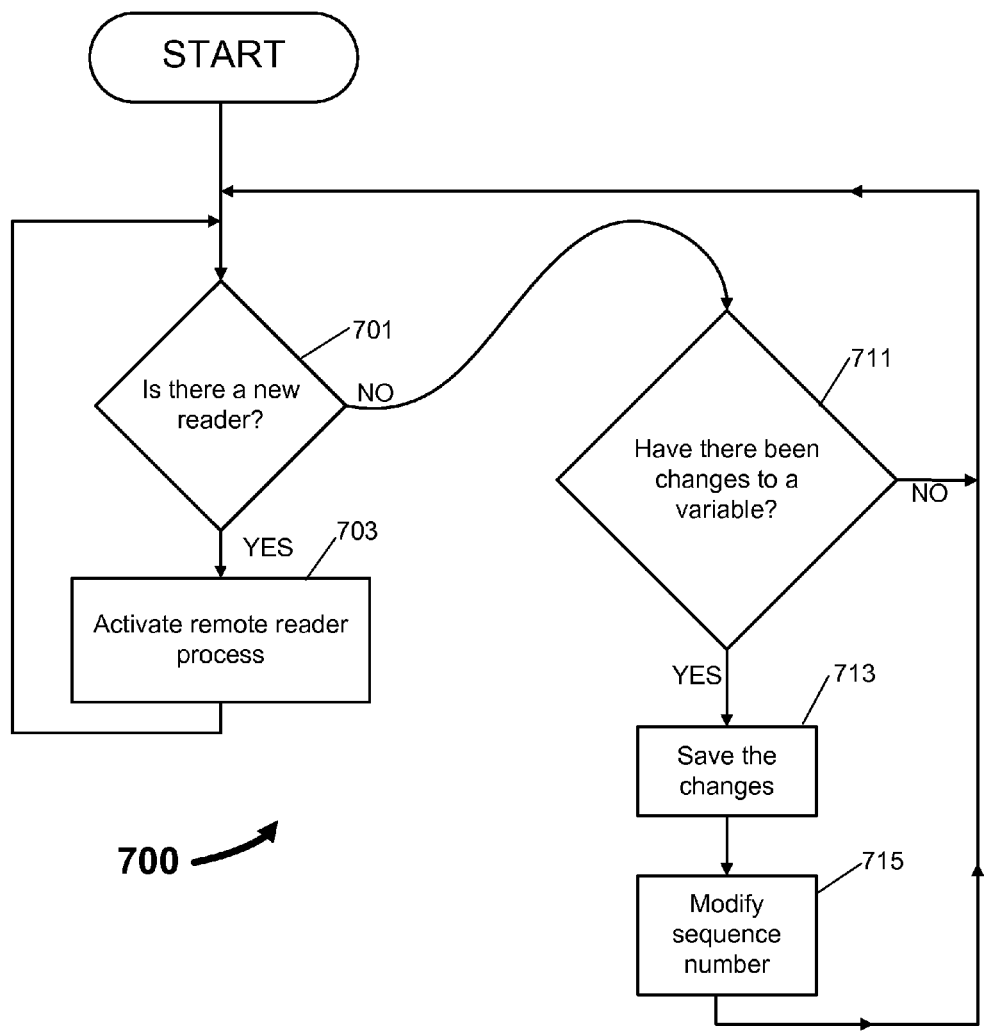
FIGS. 7A-7F are flow diagrams illustrating a Writer Process embodiment in accordance with the principles of the present invention.

FIG. 7A is a general flow diagram depicting a writer process 700 according to one embodiment of the invention. The writer process 700, for example, illustrates how a protocol using the features of the present invention operates to facilitate real-time communication of information on a real-time network.

The writer process 700 describes communications between writers mounted on nodes and associated readers (which can be mounted locally on the same node, or remotely on another node). System software and hardware track changes to variables and group objects (collectively referred to herein as "variables"). Changes to variables are communicated by a Writer to registered Readers (i.e., readers that are registered to receive information about selected variables). The variable change information transmitted between Reader objects and Writer objects is transmitted using messages which will be referred to herein as "change messages" or "changes". Generally, changes are received, put in sequence, and then stored until they can be communicated to registered readers.

When a Reader object is registered to receive changes a remote reader process is initiated (Step 703) and the changes are transmitted to registered Reader objects in the form of change messages.

FIG. 7A depicts a portion of one embodiment of the writer process 700 for writing variable change information to interested Reader objects. When viewed from a Writer object perspective, the writer process 700 begins by determining whether there are new Reader objects interested in the variables the Writer object has (Step 701). This means that the Writer object determines if there are new Reader objects registered to receive information concerning topics for which the Writer object has variable information. If there are no appropriately registered Reader objects, then the writer process 700 determines whether there have been changes to a variable (Step 711). If there have been changes to the variable, such change information is stored by the Writer object (Step 713). As the change information is stored by the Writer object, the change information is given a sequence number (Seq. No.). The Seq. No. is then modified so that each change information item is given a different sequence number. Typically, the Seq. No. is incremented after each change information item is stored. Hence, subsequent change information items will be assigned higher Seq. Nos. By such modification of the Seq. No., the order of changes to the variables can be preserved. After the Seq. No. has been modified (Step 715), the writer process 700 returns to the operation of determining if readers objects registered to receive information (Step 701).

Figure 10A:
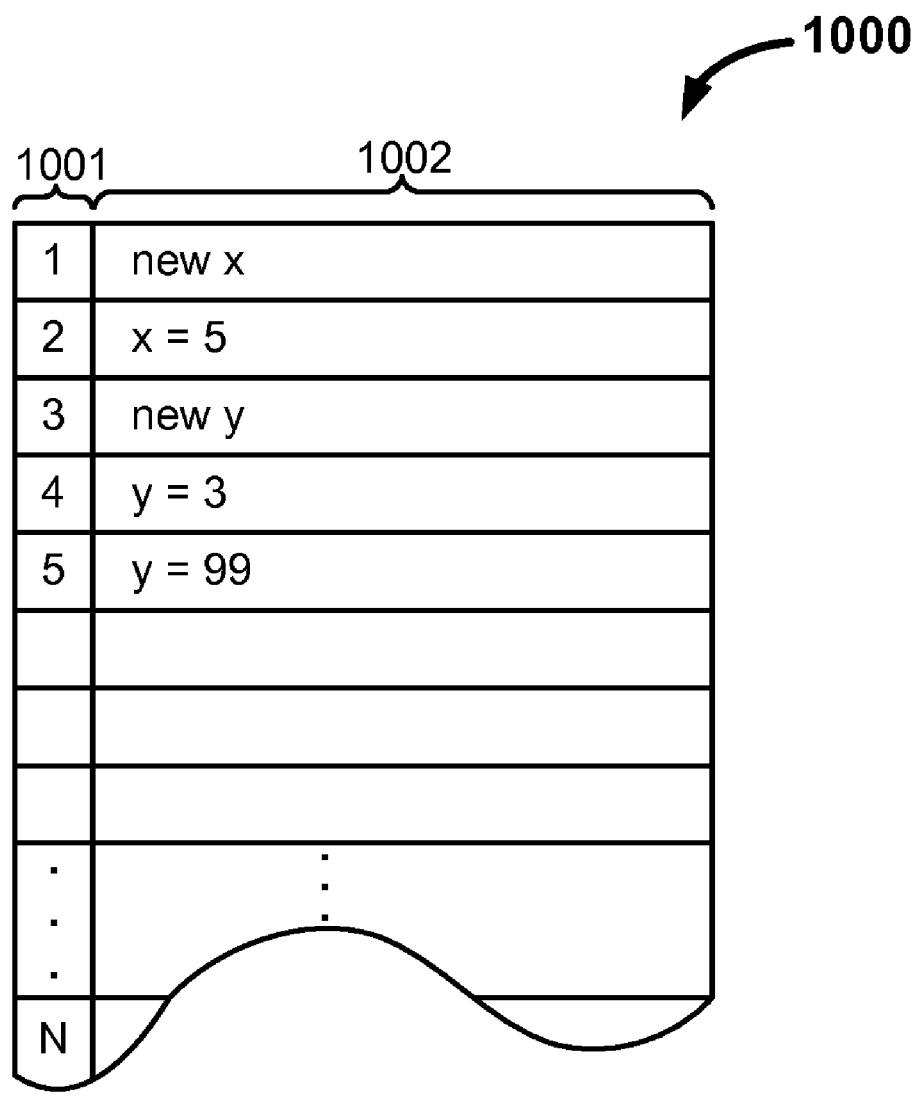
FIGS. 10A-10F are embodiments of variable reference tables and their associated remote reader reference table in accordance with the principles of the present invention.
Figure 10B:
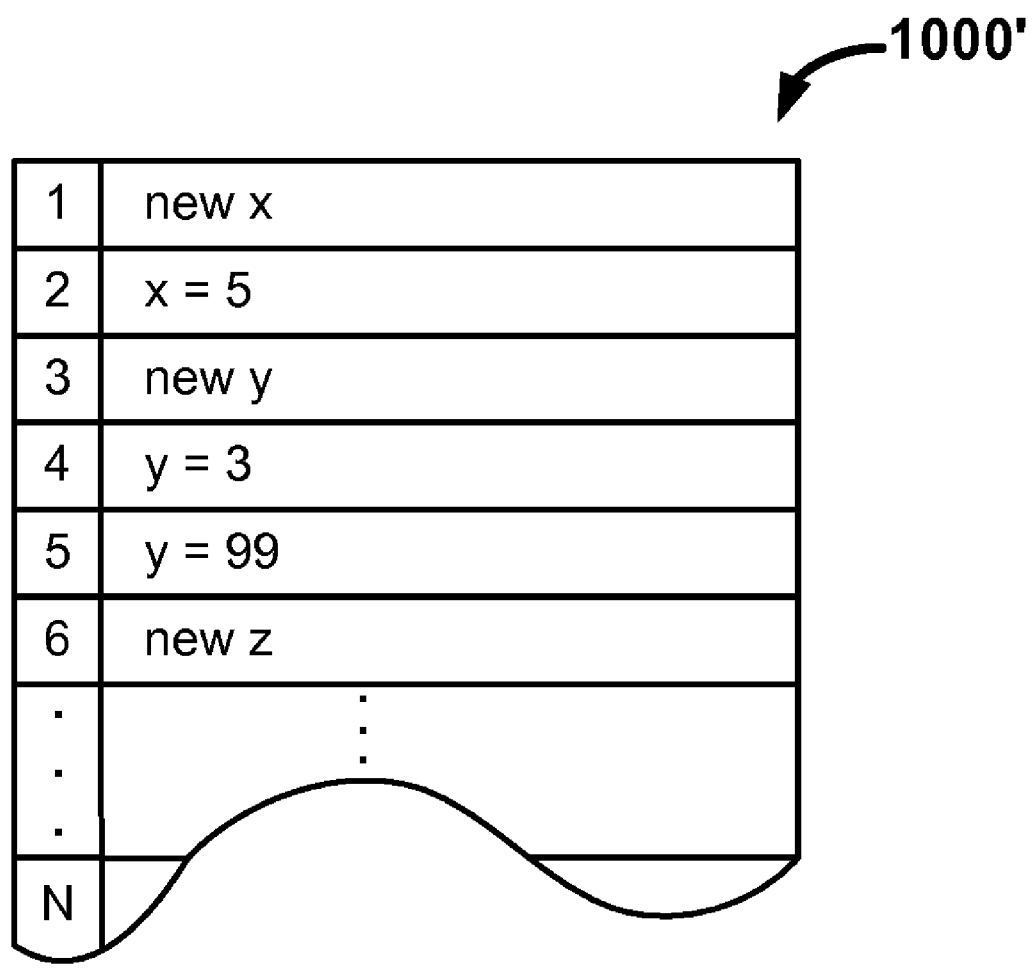

In one example, this process can be illustrated with respect to FIGS. 10A and 10B. FIG. 10A depicts a variable reference table 1000 for a group object, after five change messages have already been saved. If the state is changed, for example, by adding another variable "z", the table 1000 is updated. This depicted by the updated of the variable reference table 1000' shown in FIG. 10B. Because the addition of "z" occurs after the previously saved change messages, the change message introducing the additional variable "z" is assigned a higher Seq. No., namely, Seq. No. "6". In this way a sequence of changes can be tracked and maintained a logical sequence order.

Sequence Numbers can also be used to indicate to a Reader that a set of changes should be interpreted as a unit. This can be important in cases where other change interpretations can cause a Reader to make incorrect deductions about the state of the system. For example, variables can be used model the position of a ship using variables "x" and "y" to represent latitude and longitude, respectively. Assuming that these latitude and longitude variables are changed multiple times, resulting in a set of continuously updated variables. In one simplified example, successive "x" and "y" readings are depicted by the following set of change messages: {(x=1, y=1), (x=5, y=5), (x=10, y=10)}. These readings can represent the path followed by the ship. In order to correctly interpret the readings it is important that the change messages be interpreted correctly by the Reader. In some implementations, each change to a variable can be sent as a separate change (e.g.; (Seq. No. 1: "x=1") which is separate from (Seq. No. 2: "y=1"), which is separate from (Seq. No. 3: "x=5") and (Seq. No. 4: "y=5"), and so on). Where the readings are so separated, it is important that the order of the changes be preserved. In addition to maintaining sequential change order, it may be important to maintain the interrelationship between the changes. This is especially true where changes are not completely independent. Using the above example, change "y=1" (Seq. No. 2) and should not be grouped together with change "x=5" (Seq. No. 3) because the resulting interpretation by the Reader will result in an incorrect location (x=5, y=1). As can be imagined, this incorrect interpretation can cause the Reader to deduce that the ship is off-course or has collided with an obstacle. In this context, Seq. Nos. can be used to indicate to a Reader that the interpretation of a given change such as "x=5" (Seq. No. 3) must be associated with another change "y=5" (Seq. No. 4) in order to obtain a correct interpretation.

With continued reference to FIG. 7A, if there are one or more registered Reader objects, a remote reader process is activated (Step 703) for each Reader object. Each remote reader process can be operated sequentially or simultaneously with respect to other remote reader processes. Additionally, as new Reader objects are added to the system, remote reader processes are initiated as necessary for those Reader objects.

One embodiment of a remote reader process comprises the following operations described with respect to FIGS. 7B-7F.

Figure 7B:
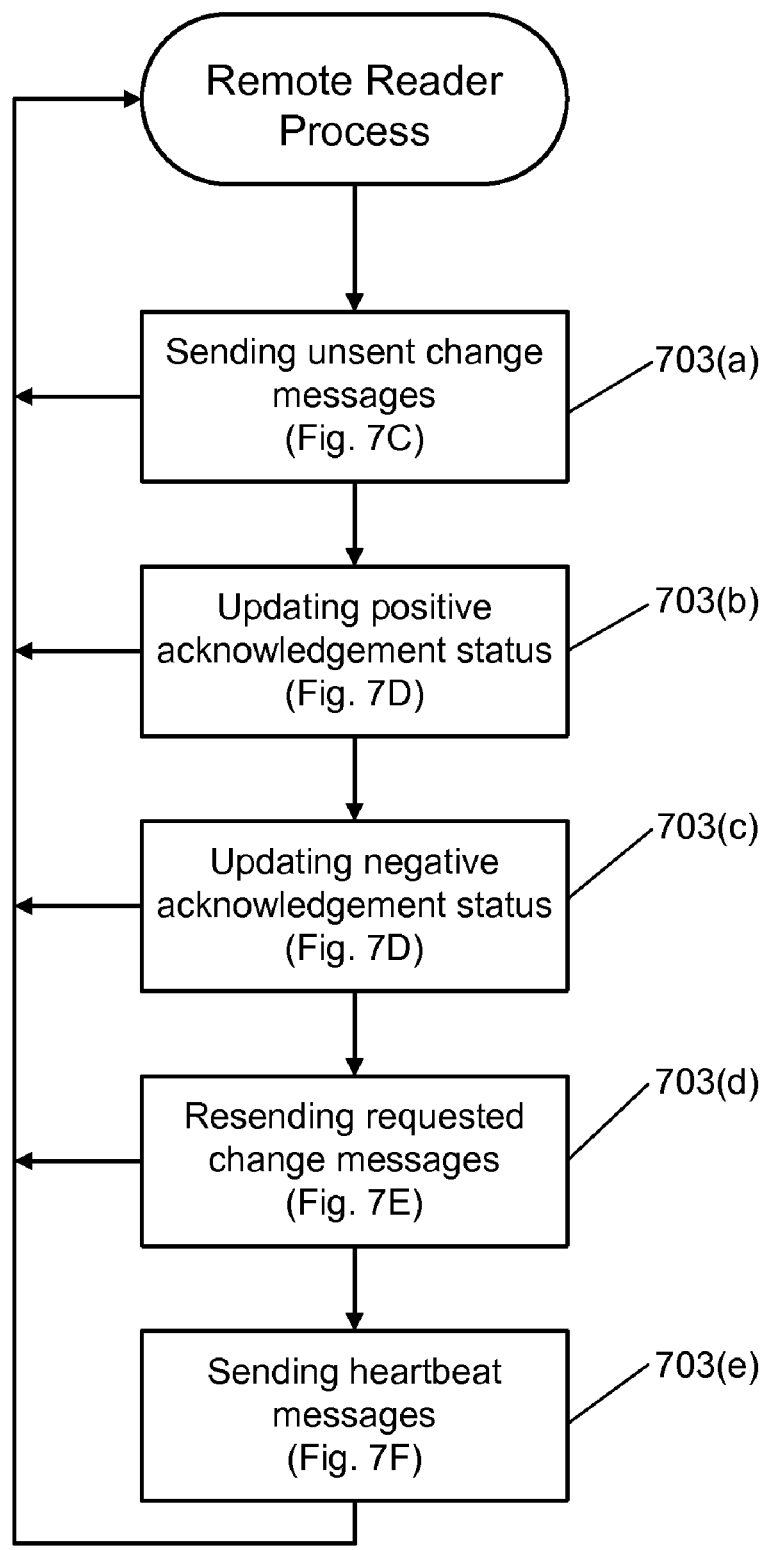

FIG. 7B is a flow diagram depicting an embodiment of a remote reader process of FIG. 7A. The remote reader process sends all unsent change messages to appropriate (registered) Reader objects (Step 703(*a*)). This processing is explained in greater detail with respect to the discussion of FIG. 7C. The remote reader process also updates the positive and negative acknowledgement status for change messages sent to the Reader object(s) (Steps 703(*b*) and 703(*c*)). These processes are explained in greater detail with respect to the discussion of FIG. 7D. As requested, change messages are resent by the remote reader process (Step 703(*d*)). This process is explained in greater detail with respect to the discussion of FIG. 7E. For certain unacknowledged messages, "heartbeat messages" can be sent with or without confirmation requests (Step 703(*e*)). This process is explained in greater detail with respect to the discussion of FIG. 7F.

Before a detailed discussion of the remote reader process is completed, a brief discussion of "timers" is in order. An advantageous feature of the invention is the use of "timers" to improve the efficiency of message traffic flow in a real-time system. When a timer-regulated process is initiated, data is not sent immediately when directed by the system, instead the timer-regulated process starts a timer with a prescribed time-interval and continues with other tasks. When the timer "fires" the process stops the timer and the actions that initiated the starting of the timer (e.g. the sending of messages) are re-assessed and undertaken if they are still pertinent. Thus, in an interim period between timer initiation and timer firing, additional data and information requests to be sent are accumulated by the system. The timer-regulated process is aware of this additional data and information requests. To the extent such message traffic pertains to messages that are relevant to the timer-regulated process, the actions taken and the messages sent, can be altered. This best illustrated in by simple example.

A timer-regulated process has been requested to send a message ($M_1$) to a message receiver A. The timer starts, for example, having duration of two seconds. Rather then sending $M_1$ as soon as requested, the process waits two seconds. In the intervening two seconds, the process receives two further requests for sending message $M_1$ to receivers B, C, D, E, F, and G. So, when the timer "fires" at the end of two seconds, one multicast message $M_1$ is sent to receivers A, B, C, D, E, F, and G. In a non-timed process, six times the amount of message traffic would be generated (one message for each receiver A, B, C, D, E, F, and G). Additionally, the time periods of the timers can be adjusted by user configuration or by adaptive algorithms to manage message traffic and bandwidth. For example, for systems with less memory capacity (and thus less ability to store large volumes of messages accumulated during "wait" periods provided by the timers) shorter time periods can be used. By contrast, in systems where bandwidth is an issue, longer wait periods could be used to reduce the amount of message traffic. Additionally, adaptive algorithms can be used to dynamically adjust time periods throughout the system to continuously adapt to system and user needs.

Figure 7C:
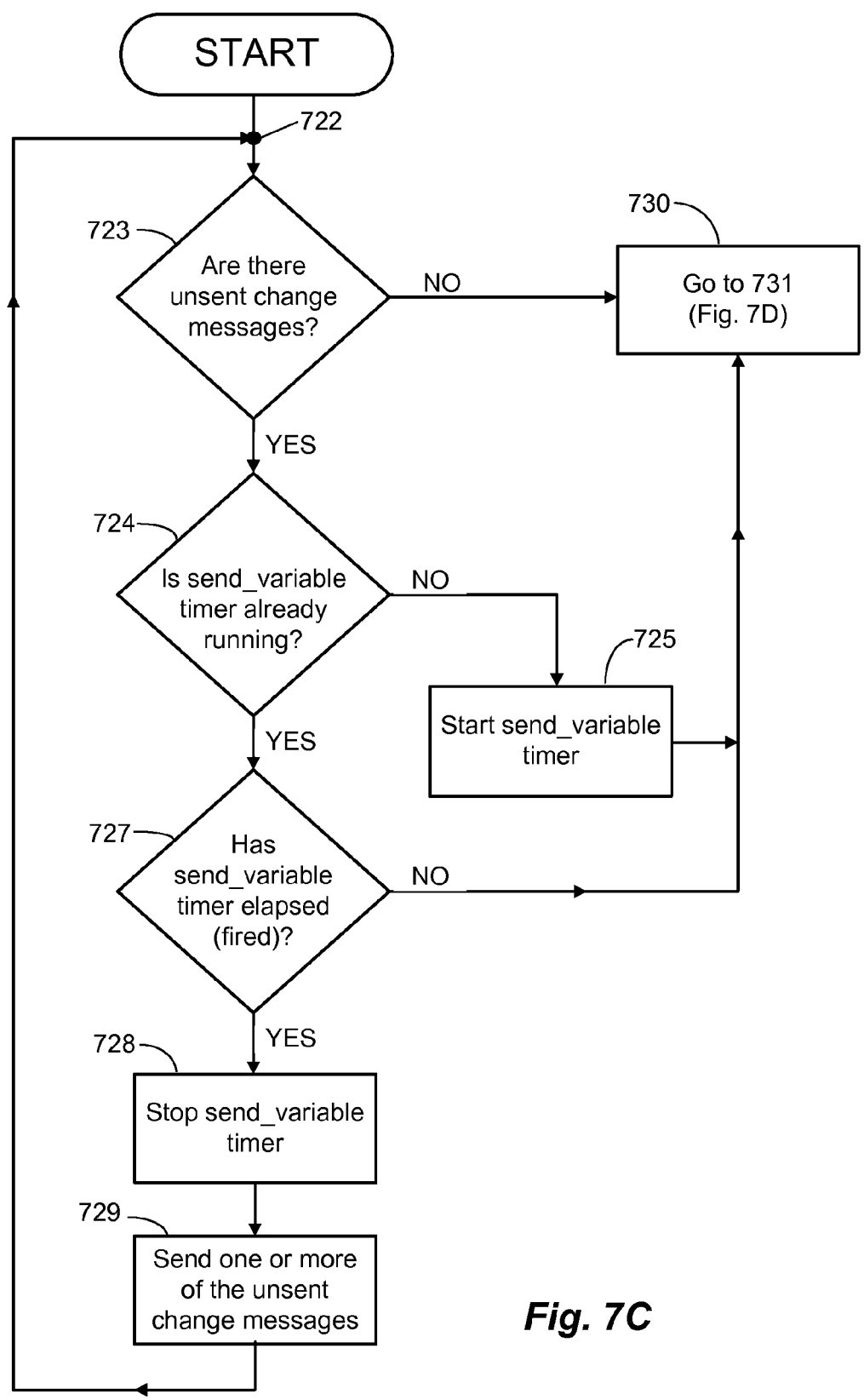

The flow diagram of FIG. 7C describes a process embodiment whereby a remote reader process can send change messages to a registered Reader object. Initially, the remote reader process determines if all change messages have been sent to the registered Reader object (Step 723). If there are any unsent changes, a first timer (a "SEND_VARIABLE" timer) is started (Step 725), unless it was already running (Step 724). Until the timer "fires" (i.e., until the time period of the timer elapses), the remote reader process defers any sending of unsent change messages and proceeds with the rest of the process (Step 730). When it is determined that the timer has fired (Step 727), the timer stops (Step 728) and the next unsent change messages are sent to Reader objects registered to receive those messages (Step 729). Typically such unsent change messages comprise unsent change messages having the lowest Seq. Nos. (i.e. the oldest remaining messages). Such messages can include changes to variables and "GAP" messages (the function of which is explained in greater detail below). The sent changes are then marked on a remote reader reference table as having been sent. Alternatively, if there are no unsent variable changes, the remote reader process proceeds to Step 703(*b*) of FIG. 7B (described in detail with respect to FIG. 7D) (Step 730).

Figure 10C:
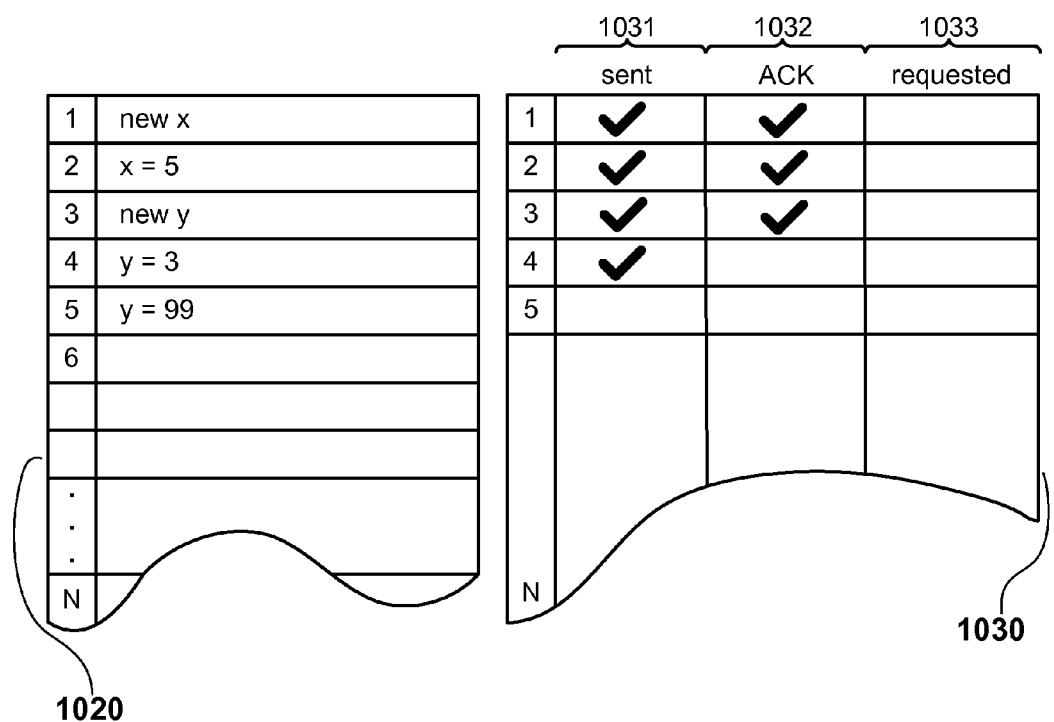

The operation of the flow diagram of FIG. 7C can be better understood with reference to FIG. 10C. FIG. 10C depicts a variable reference table 1020 (similar to that shown in FIGS. 10A and 10B) and an associated remote reader reference table 1030. Each Writer maintains a variable reference table 1020 that tracks changes to variables for the Writer and the logical order in which those changes occurred. Also, one writer object can be associated with many different reader objects, each one having its own remote reader reference table. The remote reader reference table is used to track message traffic information. For example, a remote reader reference table can track message status information including, but not limited to, messages sent to that reader object, messages received by that reader object, messages acknowledged as received by that reader object, and messages requested by that reader object.

Referring to the remote reader reference table 1030 depicted in FIG. 10C, sent messages are tracked 1031. Here, messages 1, 2, 3, and 4 have been marked as having been sent. Acknowledged messages can also tracked 1032. Here, messages 1, 2, and 3 have been marked as acknowledged as having been received by the reader object. Other included message categories within the remote reader reference table 1030 include messages requested 1033 which tracks whether the reader object has requested that the remote reader process (for the writer object) send (resend) one or more messages.

Returning to FIG. 7C, when the timer elapses (Step 727) and the timer is stopped (Step 728). Then at least one of the next unsent change messages is sent to the registered reader object. For example, consulting the variable reference table 1020 of FIG. 10C, the next unsent message (message "5", "y=99") would be sent to the reader object. Once sent, the message "5" box of the sent messages column 1031 of the variable reference table 1020 of FIG. 10C can be checked off.

Figure 7D:
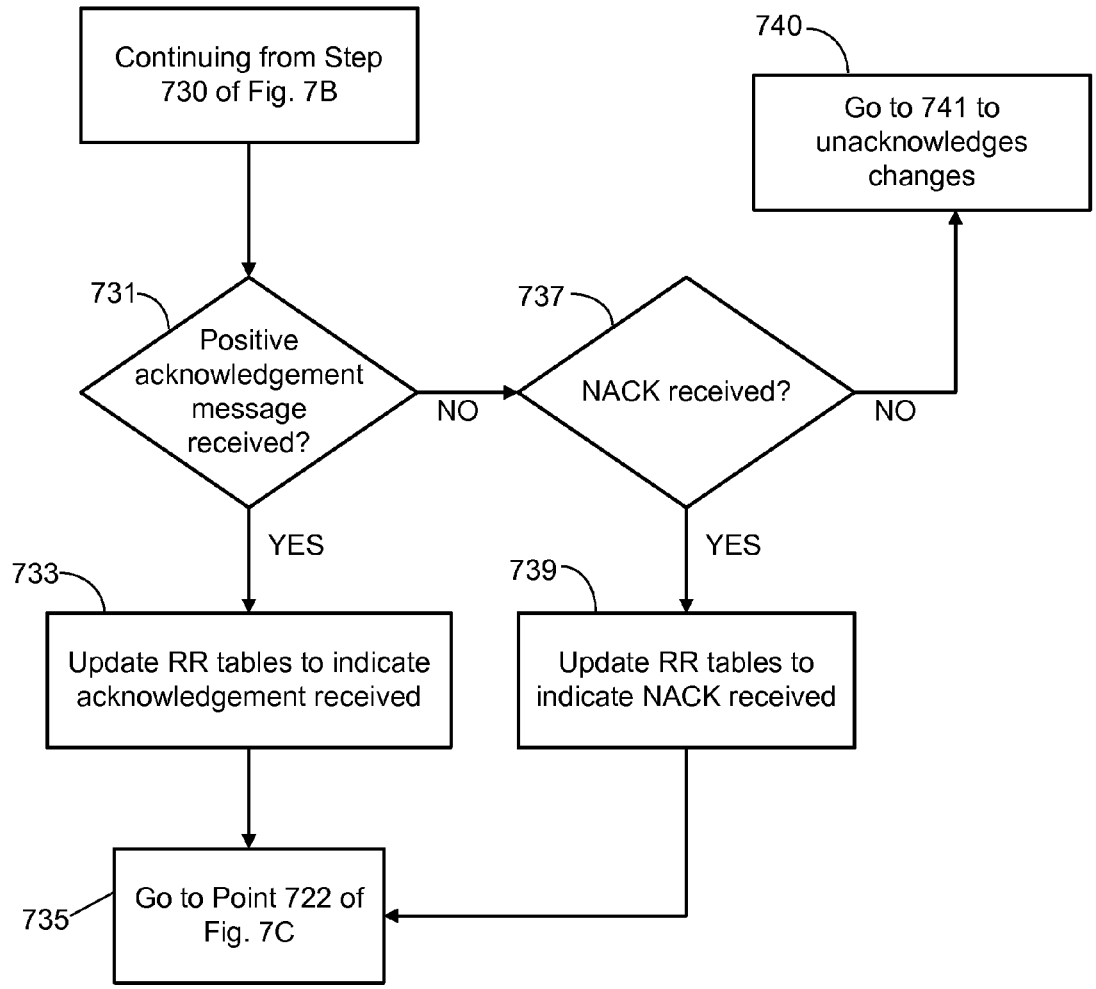

Again returning to FIG. 7C, if there are no unsent variable changes (e.g., change messages), the process continues by proceeding to 731 of FIG. 7D (Step 730) where positive and negative acknowledgements can be processed. FIG. 7D describes processing for treating not only positive acknowledgement messages (ACK) but also for treating negative acknowledgement messages (NACK's). The processing depicted in FIG. 7D determines whether a positive acknowledgement message (ACK) has been received from a reader object (Step 731). If an ACK has been sent by a reader object and received by the associated remote reader process, the remote reader reference table for that reader object is updated to reflect the acknowledgement (Step 733). Once the remote reader reference table is updated, the process returns to point 722 of FIG. 7B.

On the other hand, if it is determined (Step 731) that no ACK has been received, it is determined whether a negative acknowledgement message (NACK) has been received from a reader object (Step 737). A NACK is a request to resend unacknowledged change messages. If a NACK has been sent by a reader object and received by the associated remote reader process, the remote reader reference table for that reader object is updated to reflect the negative acknowledgement (Step 739). Once the remote reader reference table is updated, the process returns to point 722 of FIG. 7B. Alternatively, if it is determined that no NACK has been received (Step 737), then the process proceeds to 741 of FIG. 7E (Step 735).

Figure 10D:
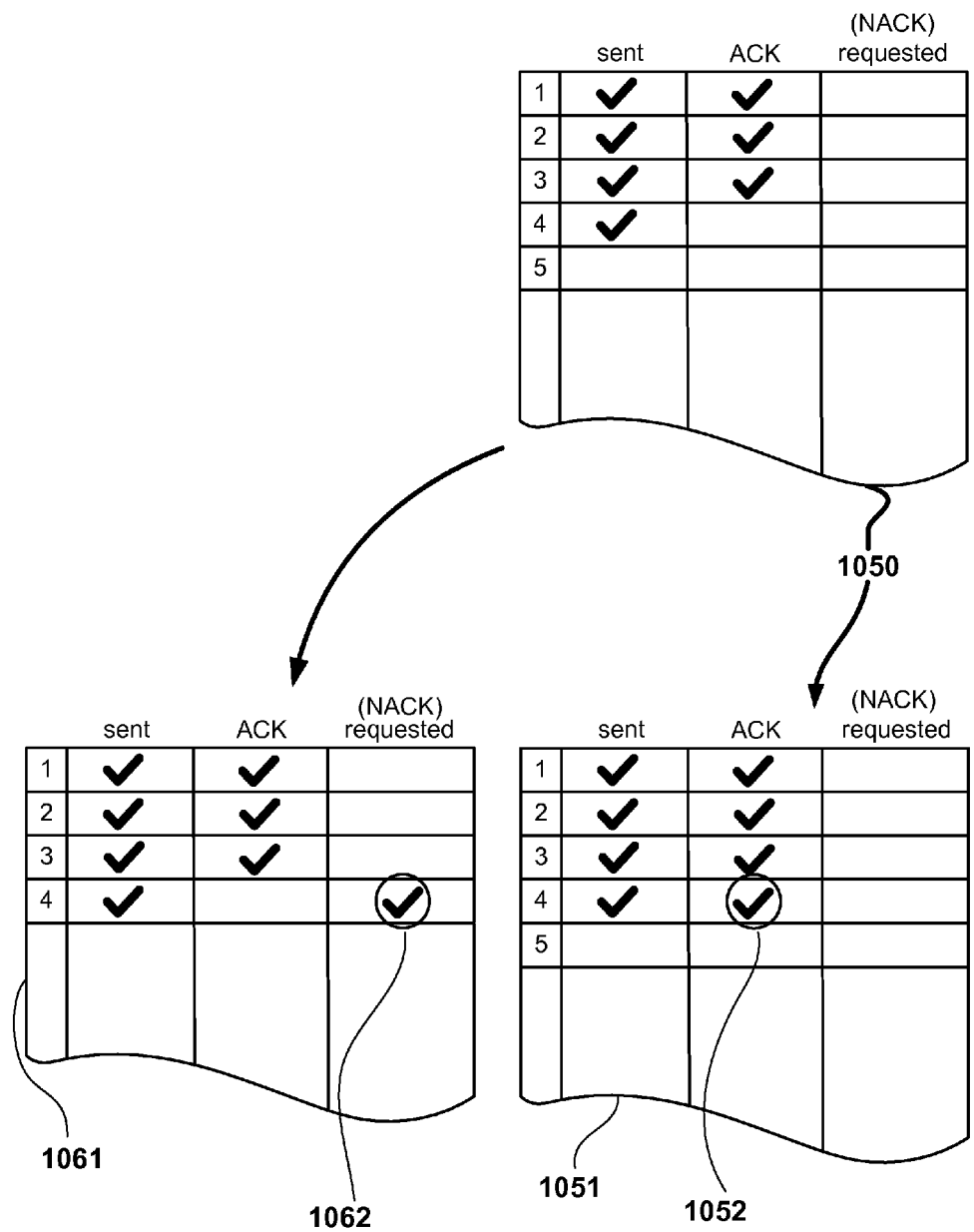

The process of updating positive acknowledgement status may be better understood with reference to FIG. 10D which illustrates this process using an embodiment of a remote reader reference table 1050. In the depicted embodiment, all change information (e.g., up to Seq. No. 4) has been sent. The highest number for a received ACK is Seq. No. 3. Then, if the reader object were to send an ACK message regarding Sequence No. 4 to the remote reader process (namely, writer object) and such ACK message were to be received, the remote reader process would cause the remote reader reference table 1051 to be updated 1052 to reflect the receipt of the ACK for Seq. No. 4. Alternatively, when a reader object sends an a NACK (negative acknowledgment) message regarding Sequence No. 4 to a remote reader process that is received, the remote reader process would cause the remote reader reference table 1061 to be updated 1062 to reflect the receipt of the NACK for Seq. No. 4.

After updating ACK or NACK status (Steps 703(b) and 703(c) of FIG. 7B), the process continues to Step 703(d) of FIG. 7B. This is illustrated as Step 740 of FIG. 7D.

Figure 7E:
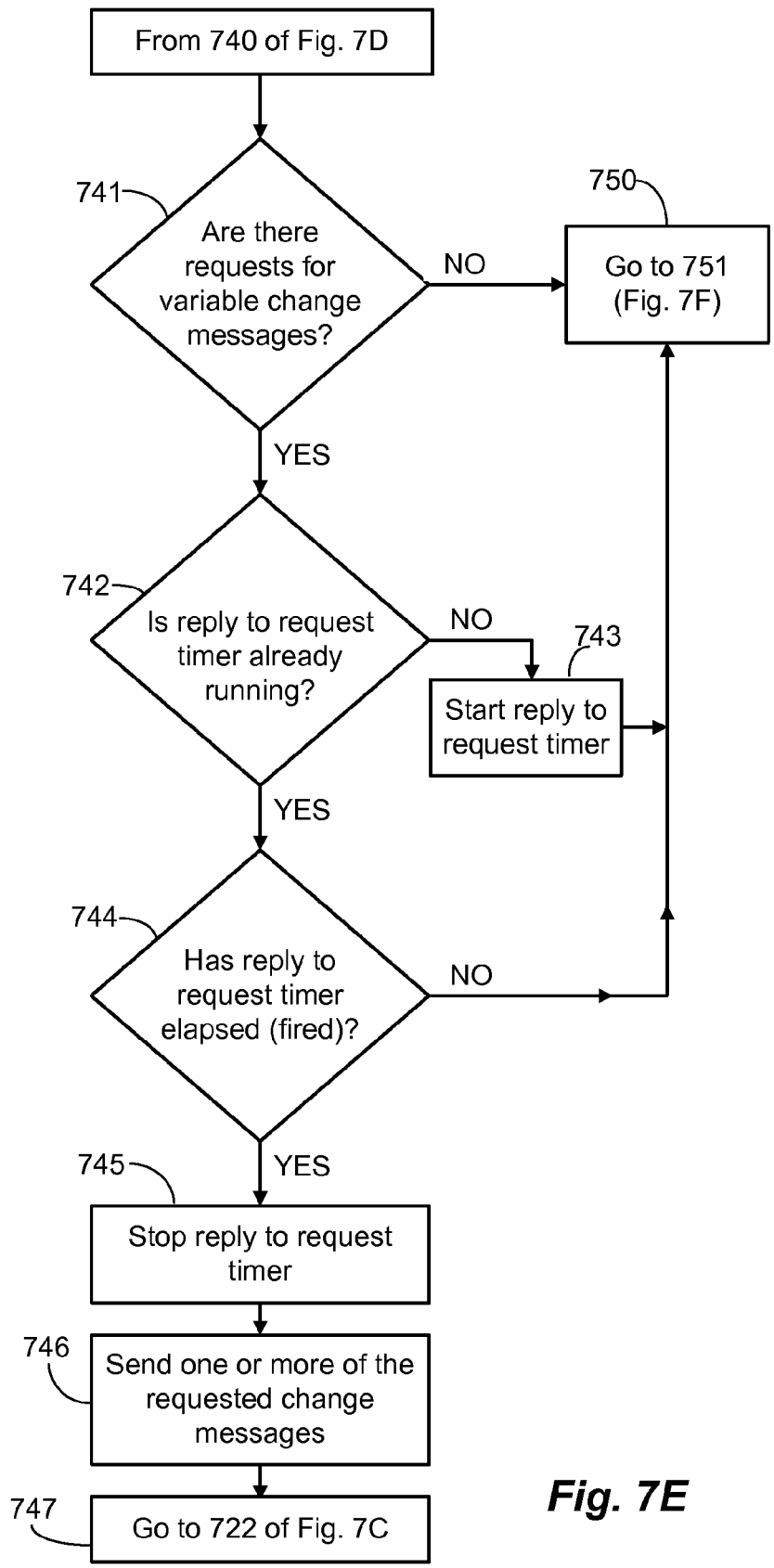

Returning to FIG. 7B, messages that are requested are resent (Step 703 (d)). This process is illustrated in FIG. 7E. The processing illustrated in FIG. 7E begins by determining whether any readers objects are requesting variable information (Step 741). This step is commonly used by reader objects to request that missed variable change messages be resent. In one implementation a remote reader reference table can be consulted to determine if the corresponding reader object has requested that variable information (e.g., change message identified by Sequence No.) be resent. These requests can be made in the form of a NACK message from the reader object for a change message having a specific Seq. No.

Figure 10E:
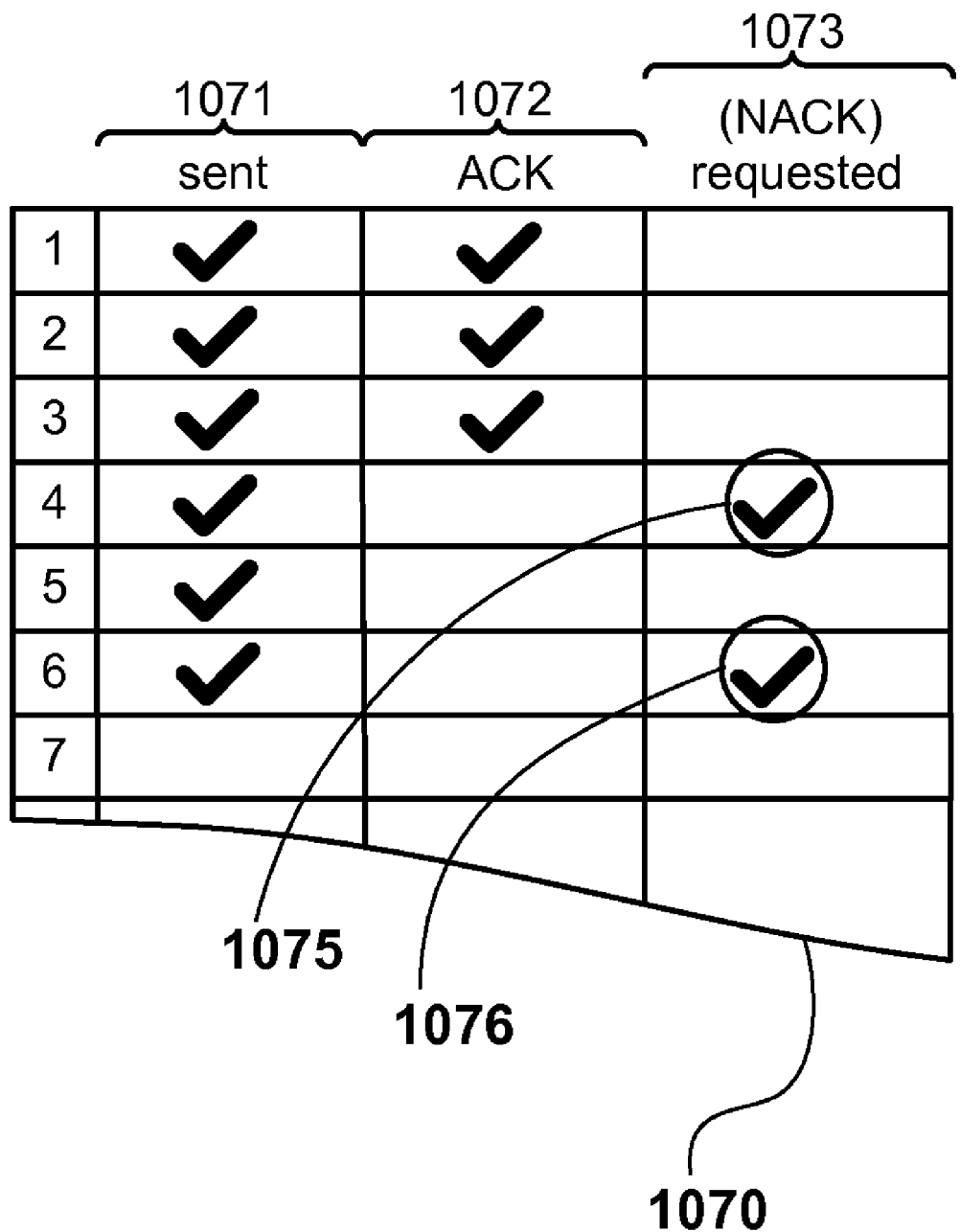

FIG. 10E depicts an example of a remote reader reference table 1070 that can be used to facilitate the process of determining whether there are requests to resend change messages. The remote reader reference table 1070 tracks messages sent 1071 and messages acknowledged as received 1072. Additionally, messages that have been requested by the reader object are tracked 1073. In the depicted embodiment, messages 1-6 have been sent, messages 1, 2, and 3 have been received and acknowledged, and the reader object has requested (through the use of NACK messages) that messages 4 and 6 be resent (see FIG. 10E, 1075 and 1076 respectively). It is likely that the change message represented by Seq. No. 5 has already been received, and that is why the Reader has not requested a re-send for it.

Returning to FIG. 7E, if there are no requests for variable change messages, the process continues to Step 703(e) of FIG. 7B. This is reflected by activating the process illustrated in FIG. 7F (Step 750). However, if there are pending requests for variable change information (Step 741), and a second timer (a "reply to request" timer) is not already started, then the second timer is started (Step 743). The process continues to Step 750. However, if the second timer was already running the process checks if it has fired (Step 744). If the second ("reply to request") timer has not fired then the process continues to Step 750. But, if the second timer has fired (Step 744), then the remote reader reference table is consulted, and the pending requests for change messages are located and identified. Indicators 1075 and 1076 for such identified requests are shown in FIG. 10E. The process then stops the timer (Step 745) and sends at least one of the identified requested variable change messages to the requesting reader objects (Step 746). In most cases the change messages sent will be those the identified requested variable change messages having the lowest Seq. Nos. (i.e. the oldest messages). Such messages can include changes to variables and GAP messages (GAP messages will be explained in greater detail below). At this point the processing returns to point 722 of FIG. 7C (Step 747).

Figure 7F:
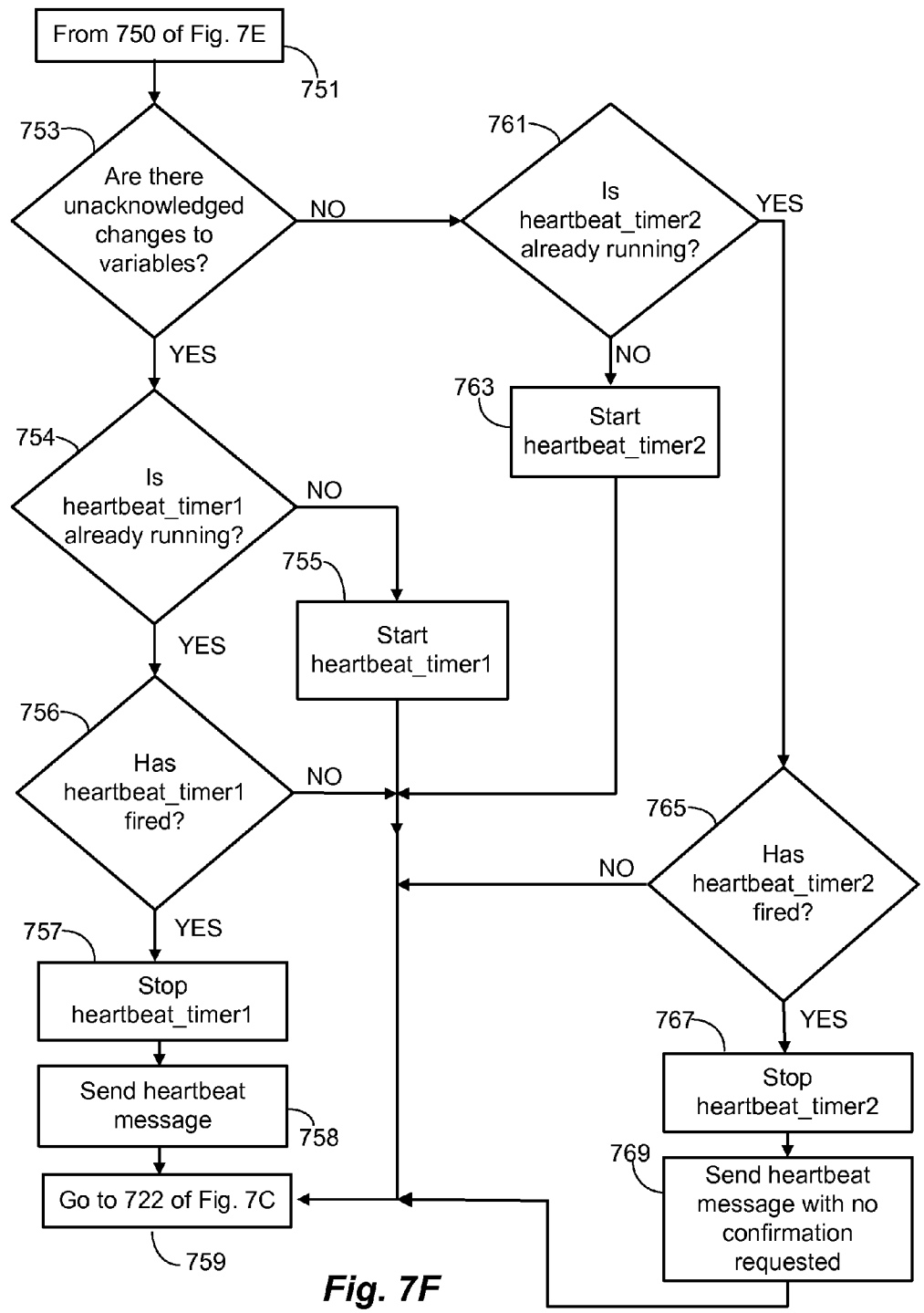
Figure 10F:
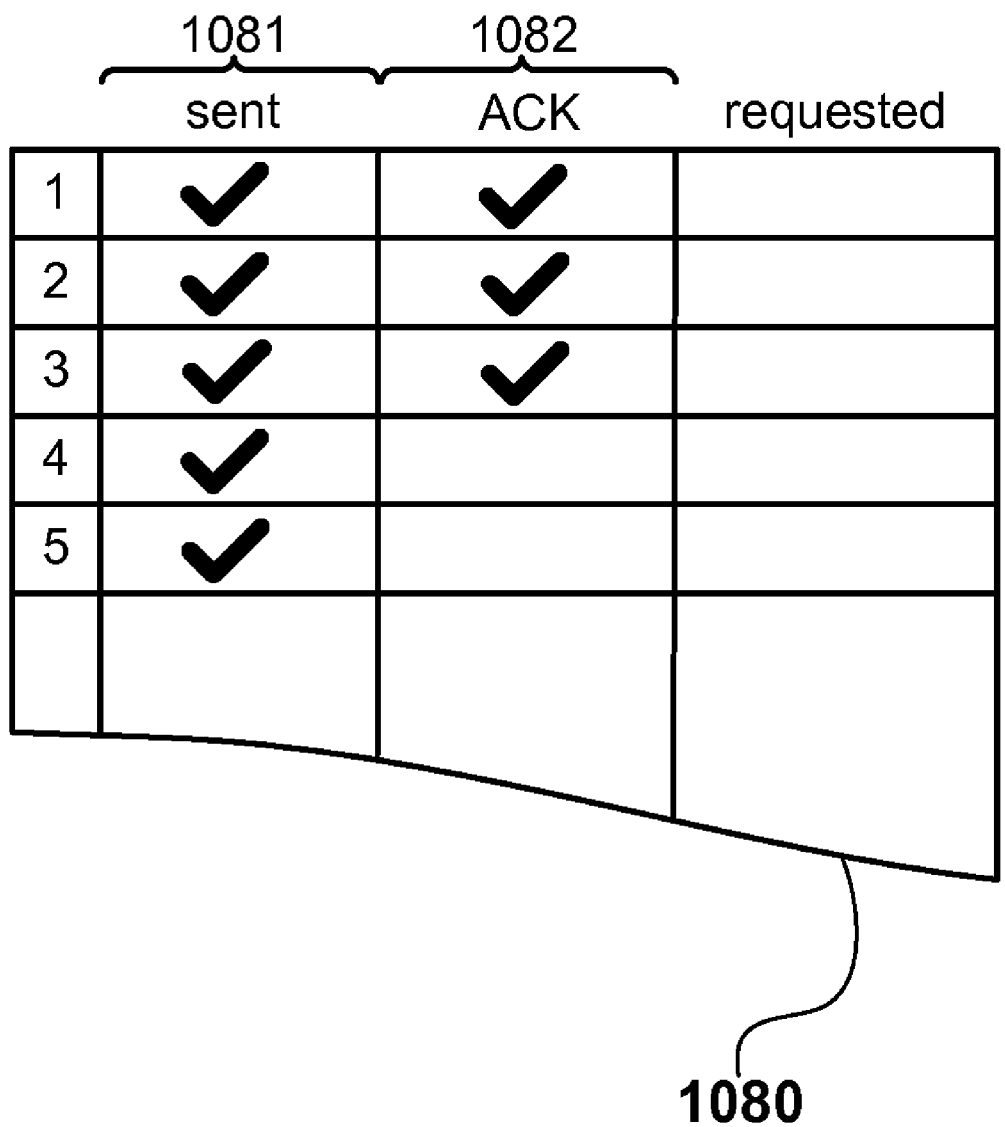

FIG. 7F describes processing for treating heartbeat messages. A heartbeat message ("heartbeat") is a message that tells a reader object the highest sequence number (of a message) from the writer that should have been received by the reader object. The process of FIG. 7F can be more fully explained by making reference to FIG. 10F. FIG. 10F depicts a remote reader reference table 1080. The remote reader reference table 1080 indicates messages 1-5 have been sent 1081 and messages 1-3 have been acknowledged 1082. In particular, message 4 has been sent and received, but not acknowledged.

Returning to FIG. 7F, the process determines if there are unacknowledged variable change messages (Step 753). As indicated, message 4 is an unacknowledged variable change message. This starts a third timer ("timer 3") (Step 755). Until the time period of third timer elapses and the timer "fires," the processing waits for the third timer to fire (Step 757). When the third timer does fires, then a heartbeat is sent to the reader object (Step 758). This heartbeat identifies the highest Seq. No. of a message sent, thus far, by the writer object (namely, the associated remote reader process). For example, using FIG. 10F, the highest Seq. No. for a sent message is Seq. No. 5. Inherent in such heartbeat messages is a request for acknowledgement that the sent messages have been received. At this point the process returns to point 722 of FIG. 7C (Step 759).

As shown in FIG. 7F, the process determines if there are unacknowledged variable change messages (Step 753). As indicated, message 4 is an unacknowledged variable change message. Where a third timer is not already running (Step 754), this starts the third timer ("heartbeat_timer1") (Step 755). If the third timer is already started (Step 754), or was started but it has not fired (Step 756), the process goes back to point 722 of FIG. 7C (Step 759). Once the "heartbeat_timer1" fires (Step 756) the process stops the timer (Step 757) and sends a heartbeat message to the reader (Step 758). The heartbeat identifies the highest Seq. No. of the variable change message sent by the writer to the Reader process. For example, using FIG. 10F, the highest Seq. No. for a sent message is Seq. No. 5. Inherent in such heartbeat messages is a request for acknowledgement that the sent messages have been received. At this point the process returns to point 722 of FIG. 7C (Step 759).

Still referring to FIG. 7F, if there are no unacknowledged variable change messages (in Step 753), the processing continues by activating the portion of the process illustrated by Steps 761-769 and Step 759. If there are no unacknowledged variable changes in Step 753, then the process checks whether another fourth timer ("heartbeat_timer2") has already been started (Step 761). If it has not been started, the process starts the fourth timer (Step 763) and then returns to point 722 of FIG. 7C (Step 759). Where the fourth timer has been started but has not yet fired (Step 765), the process also goes back to back to point 722 of FIG. 7C (Step 759). However, when the fourth timer ("heartbeat_timer2") fires (Step 765), the process stops the timer (Step 767). Then a heartbeat message stating that no confirmation is requested is sent to the reader object (Step 769). At this point the processing returns to point 722 of FIG. 7C (Step 759). Previous reference has been made to "GAP" messages. GAP messages can be used to provide a continually updated picture of a group object and can be used to limit the amount of memory required to store the history of changes the variables within the group have undergone. Furthermore, GAP messages can be used to present a different view of a group object to different remote readers that may only be interested in a subset of the variables within the group.

Figure 8:
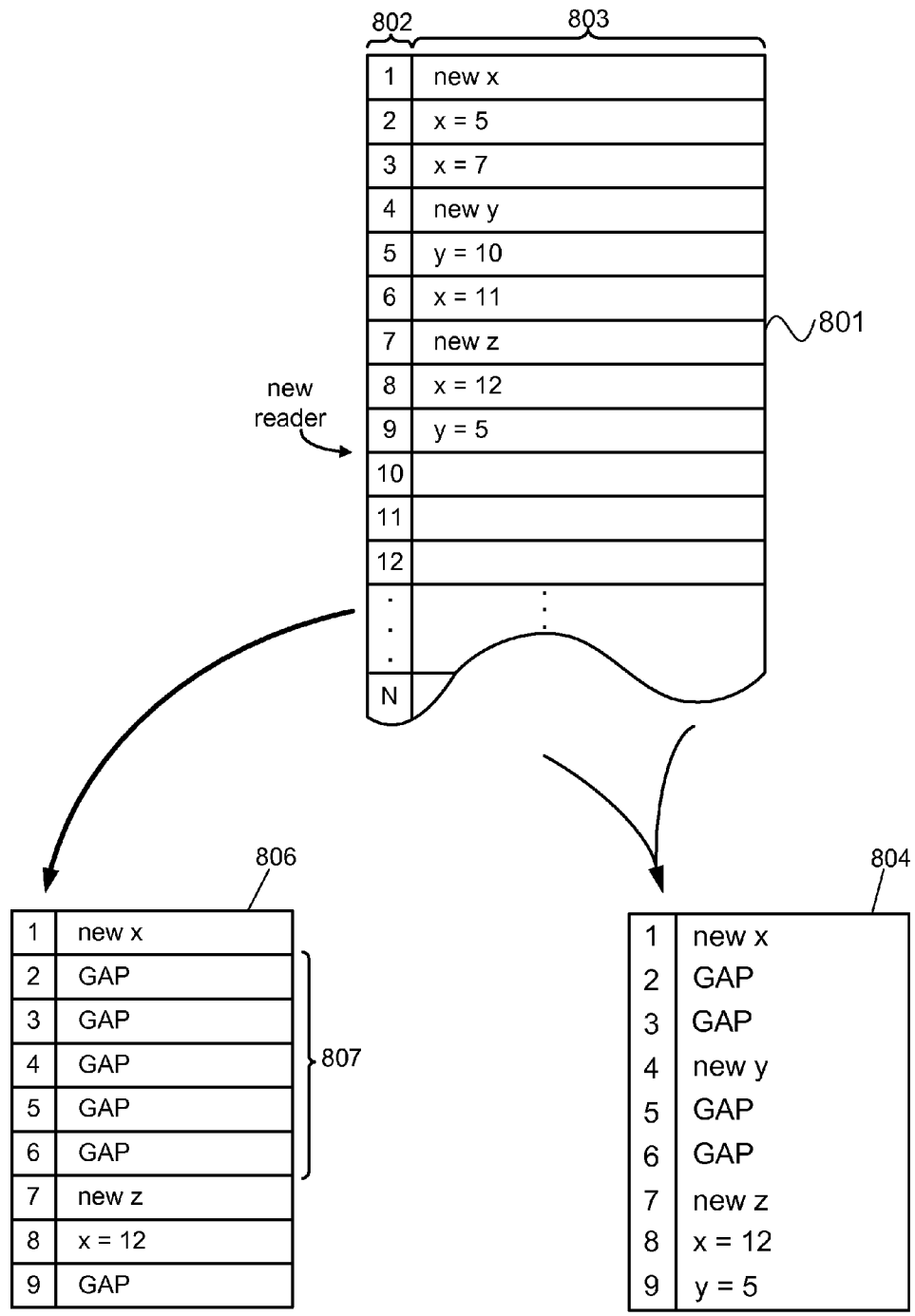
FIG. 8 is diagram illustrating the implementation of GAP messages in accordance with the principles of the present invention.

One implementation of such GAP messages can be explained with respect to FIG. 8, which depicts an embodiment of a variable reference table 801. As previously discussed, a variable reference table 801 includes a list of Seq. Nos. 802 and a list of variable change messages 803 associated with the Seq. Nos. 802. In this example, the variable reference table 801 illustrates a series of changes to the variable pertaining to a group object. Using the depicted table 801 as an example, a first message (having Seq. No. 1) tracks the addition of a new variable "x" to the group object. At some later time, new variables "y" and "z" have also been added to the group object (i.e., messages 4 and 7). Messages updating values for "x" (messages 2, 3, 6, and 8) have also been posted to the table 801, as have messages updating values for "y" (messages 5 and 9). If a reader object is interested in the current value of a variables, older information is not particularly relevant or important to the reader object. The "GAP" message is a convenient way of efficiently dealing with this situation. For example, if a new reader object is connected to a real-time network after message 9, GAP messages can be used to efficiently present the current state of the group object to the reader object. In an implementation where only the most current information is desired by the reader object, GAP messages replace all prior values for each variable. As an example, chart 804 shown in FIG. 8 depicts a list of the variable messages and GAP messages that represent the current state of the group object to the reader object (that is activated connected to the writer object after Sequence No. 9). Only the addition of new variables and their most recent values is presented. All other messages can be replaced with GAP messages. Thus, the Chart 804 depicts the following change messages and Seq. Nos.: 1: "new x"; 2: GAP; 3: GAP; 4: "new y"; 5: GAP; 6: GAP; 7: "new z"; 8: "x=12"; 9: "y=5". A more complete history of the previous values for variables can also be presented. In such cases GAP messages replace only the older messages (in one example, all changes except for the last three changes affecting each variable "x", "y", or "z" may be replaced with GAP messages).

In another example (explained with reference to table 806 of FIG. 8), where a reader is only interested in variables "x" and "z", the latest state of the group object with the sequence following sequence of messages is depicted. Table 806 which is only interested in variables "x" and "z" includes the following set of Seq. Nos. and values. Seq. Nos.: 1: "new x"; 2: GAP; 3: GAP; 4: GAP; 5: GAP; 6: GAP; 7: "new z"; 8: "x=12"; 9: GAP. Additionally, the format of the GAP submessage (described in greater detail hereinbelow) allows for consecutive GAP submessages (such as in 807) to be grouped to further reduce the actual number of submessages sent by the system. For example, referring to table 806, the complete sequence of change information can be sent using five submessages (e.g.; Seq. No. 1 "new x"; one GAP that includes Seq. Nos. 2 through 6; Seq. No. 7 "new z"; Seq. No. 8 "x=12"; and a GAP for Seq. No. 9).The general mechanism for determining which changes are to be propagated to a remote reader and which changes which can be coalesced into combination of new GAP and modified changes is described hereinbelow. A writer propagates its most current state to readers associated with the writer. It is not necessary for the writer to propagate all the changes to a reader causing the reader goes though all the same states as the writer. Nor it is required that the writer maintain a record of all changes (and states) as long as the reader can recreate a valid subset of states of the writer, and as long as the logical order in which the subset of writer states experienced by the reader consistent with the order of states in the writer.

More formally, a writer can be considered to have a state "S" consisting of the values of all the data objects it contains. As these data objects are modified, the state of the writer also changes and thus we can see the writer as transitioning through a sequence of states S1, S2, S3, etc. Any one of the states $S_N$ can be decomposed as a sequence of changes $C_1$, $C_2, \ldots C_N$. Each of these changes typically represent changes (deltas) from the previous state (e.g.; the addition of new data objects, the removal of existing data objects, modifications to values for existing data objects, and numerous other changes). So a sequence of states (e.g.; $S_1, S_2, S_3, S_4, \ldots$) of a group object can be expressed as containing the sequence of changes ($C_1, C_2, \ldots C_N$) as follows. $S_1=C_1$; $S_2=C_1+C_2$; $S_3=C_1+C_2+C_3$; $S_4=C_1+C_2+C_3+C_4$; and so on. A writer can ensure that each reader only sees a subset of the valid states (here, $S_1, S_2, S_3, S_4$) in the correct logical sequence. In other words a reader could be presented with states in order $S_1, S_2, S_3, S_4$, but not in order $S_1, S_3, S_4, S_2$, nor order where $S_1, S_x, S_4$, where state $S_x$ is not a valid state of the group object in the writer.

As previously mentioned each individual change in a sequence of the changes ($C_1, C_2, \ldots C_N$) need not be preserved. For instance assume that the group of changes $C_{23}$ represents the change sequence $C_2+C_3$. A writer can propagate $C_1$, $C_{23}$, and $C_4$ as changes. The receiving reader observes states $S_1, S_3, S_4$. Referring again to tables 803 and 804 in FIG. 8, example states are: $S_1=\{x=<unset>\}$, $S_2=\{x=5\}$, $S_3=\{x=7\}$, $S_4=\{x=7, y=<unset>\}$, $S_5=\{x=7, y=10\}$, $S_6=\{x=11, y=10\}$, $S_7=\{x=11, y=10, z=<unset>\}$, $S_8=\{x=12, y=10, z=<unset>\}$, $S_9=\{x=12, y=5, z=<unset>\}$. In this same example change $C_1$ represents the creation of the new "x" variable at Seq. No. 1. Change $C_2$ represents the change occurring at Seq. No. 2 setting x=5 and change $C_3$ represents the change at Seq. No. 3 that sets x=7, and so forth. Changes $C_2$ and $C_3$ can be combined into the single change $C_{23}$ which simply sets x=7. A remote reader receiving the change messages in table 804 observes $C_1$ as new "x"; GAP for Seq. No 2, $C_{23}$ will reconstruct the states $S_1'=\{x=<unset>\}=S_1$, $S_2'=\{x=<unset>\}=S_1$, $S_3'=\{x=7\}=S_3$ which is a proper subset of the sequence $S_1$, $S_2$, $S_3$, and so on.

Furthermore, with respect to a specific reader, a writer only needs to propagate the changes needed to reconstruct a projection of the state of the writer that includes only changes the reader is interested in. The projected state being defined as the state of the group object when only the values of the variables of interest to the reader are considered in the definition of the state. Again referring to the example in FIG. 8, table 806 depicts the projection of the writer onto a reader that is only interested in variables "x" and "z" and thus the only changes propagated are those pertaining to variables "x" and "z". It is worthwhile to note that even though different variables are important to different readers, the writer preserves the logical sequence of changes for each reader. Additionally, change information can be selected by readers based on many different parameters, including, but not limited to identity (topic) of the variable, variable metadata, or the contents of the data itself.

The importance of, in some embodiments, grouping changes so that the reader does not misinterpret the state of the system was previously discussed. This means that each change in the state of a group object associated with the writer can involve changes to more than one variable of the group object. In other words, transitioning from one valid state of the group object to the next valid state of the group object may require multiple changes.

In one illustration, a simplified group object includes variables "x" and "y". The simplified group object has a set of valid states $S_1$, $S_2$, $S_3$, comprising $S_1=\{x=1, y=1\}$, $S_2=\{x=5, y=5\}$, $S_3=\{x=10, y=10\}$. To maintain a propagation of these valid states requires that the changes be aggregated in a particular way. For example, the above example can include six changes $C_1$, $C_2$, $C_3$, $C_4$, $C_5$, and $C_6$, where $C_1$="x=1", $C_2$="y=1", $C_3$="x=5", $C_4$="y=5", $C_5$="x=10", $C_6$="y=10". Using these changes $C_1$ is aggregated with $C_2$, $C_3$ is aggregated with $C_4$, and $C_5$ is aggregated with $C_6$. This can be accomplished by the RTPS protocol by including an additional Seq. No. propagated with each change submessage. This additional Seq. No. is included in the change submessage thereby identifying the Seq. No. of the last change that belongs to the aggregation of changes. For example, a submessage containing $C_1$ can also contain Seq. No. 2 (identifying the Seq. No. of the last change in this aggregation), and the submessage containing $C_2$ also contains Seq. No. 2 (identifying the Seq. No. of the last change in this aggregation, effectively ending the aggregation). In like manner, a submessage containing $C_3$ can also contain Seq. No. 4 (identifying the Seq. No. for the last change in the aggregation) and the submessage containing $C_4$ contains Seq. No. 4 (identifying the Seq. No. of the last change in this aggregation, thereby ending the aggregation). These approach can be used to aggregate all such groups of associated changes. Additionally, this approach is readily extended to groups of changes having several (more than two) changes as part of the same aggregation.

Figure 9A:
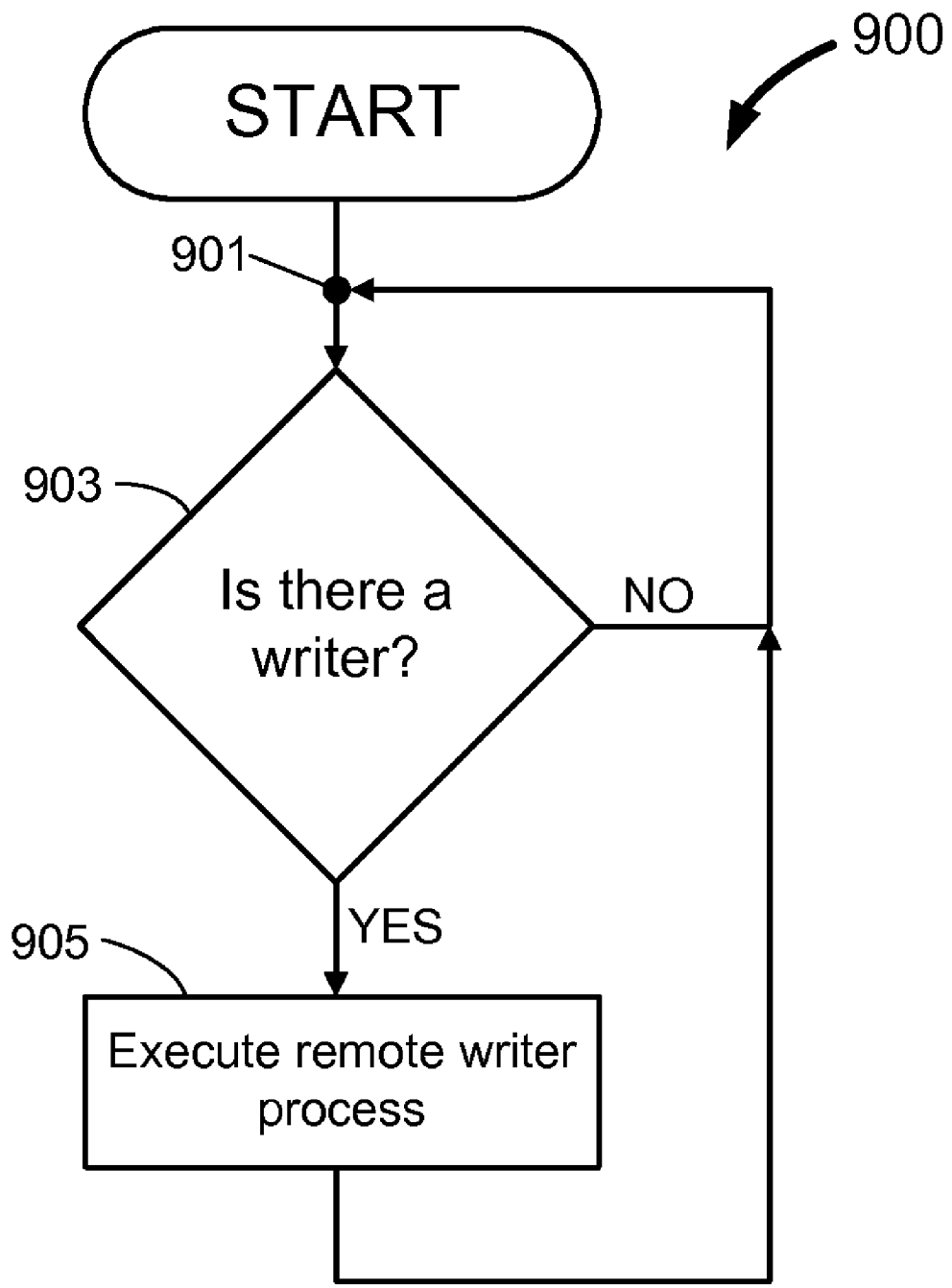
FIGS. 9A-9E are flow diagrams illustrating a Reader Process embodiment in accordance with the principles of the present invention.

Working in conjunction with the above-described writer process and remote reader process is a corresponding reader process and a remote writer process. FIG. 9A is a general depiction of such a reader process 900 for receiving change information and heartbeat messages (requests for confirmation) from writers to the readers. Also, the reader process 900 facilitates the communication of acknowledgements (confirmations) and negative acknowledgements (requests) from the readers back to the writers. From the readers point of view, a writer is identified and a remote writer process is initiated (Steps 901-905). The details of this reader process and associated remote writer process are described in greater detail herein below.

When viewed from a reader perspective, the processing begins with the reader determining if there are writers that have variables with topics the reader is interested in (Step 903). This means that registered readers can determine if there are writers having variables pertaining to the topics that the reader is interested in. If there are no appropriate writers, the processing returns to point 901 until such a writer appears. If there are appropriate writers, then a remote writer process is initiated and executed (Step 905).

Figure 9B:
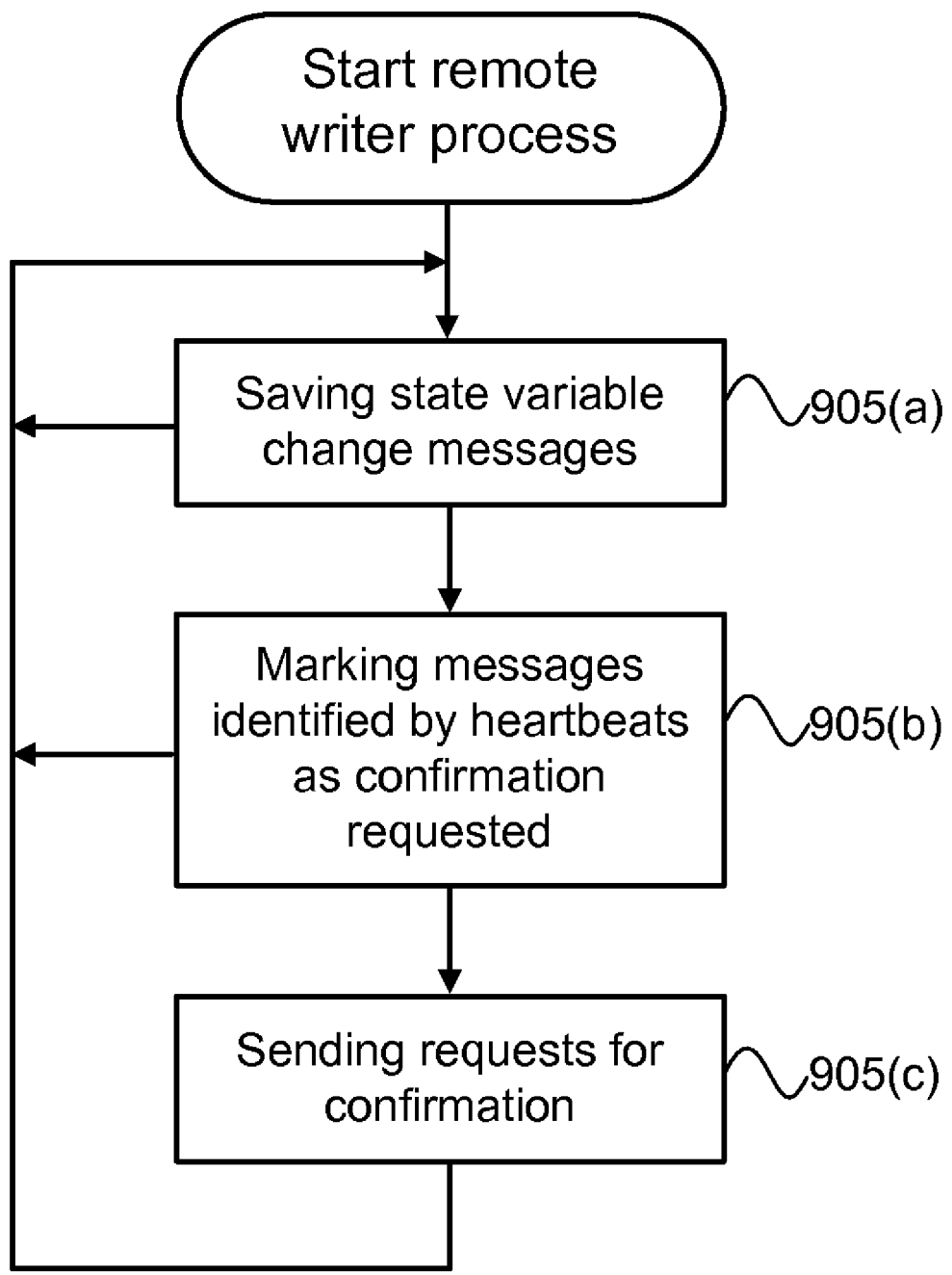

FIG. 9B is a flow diagram depicting an embodiment of remote writer processing (Step 905) of FIG. 9A. The remote writer processing stores all received variable change messages (Step 905(*a*)), thereby receiving the variable information. This processing is explained in greater detail below with respect to the discussion of FIG. 9C. The remote writer processing also marks messages identified in heartbeat messages as confirmation requested (Step 905(*b*)). This processing is explained in greater detail below with respect to the discussion of FIG. 9D. Requests and confirmations can also be sent (Step 905(*c*)). This processing is explained in greater detail below with respect to the discussion of FIG. 9E.

Figure 9C:
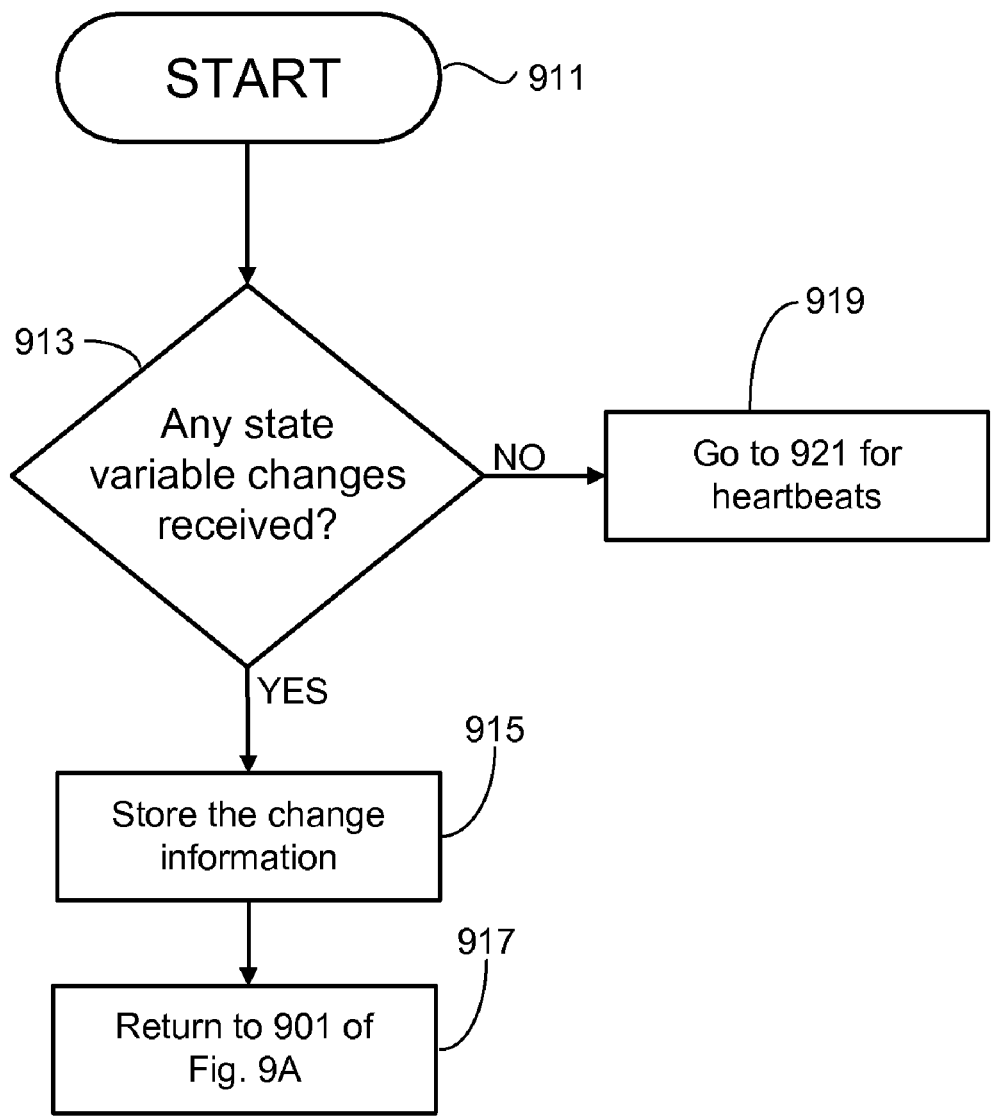

FIG. 9C depicts the treatment of variable change messages by a portion of the remote writer process. The processing begins by starting the remote writer process (Step 911). The process determines whether a new variable change message has been received at the reader object (Step 913). If a variable change message has been received, the change information included in the variable change message is stored (Step 915). Once stored, the processing returns to point 901 of FIG. 9A (Step 917).

Figure 9D:
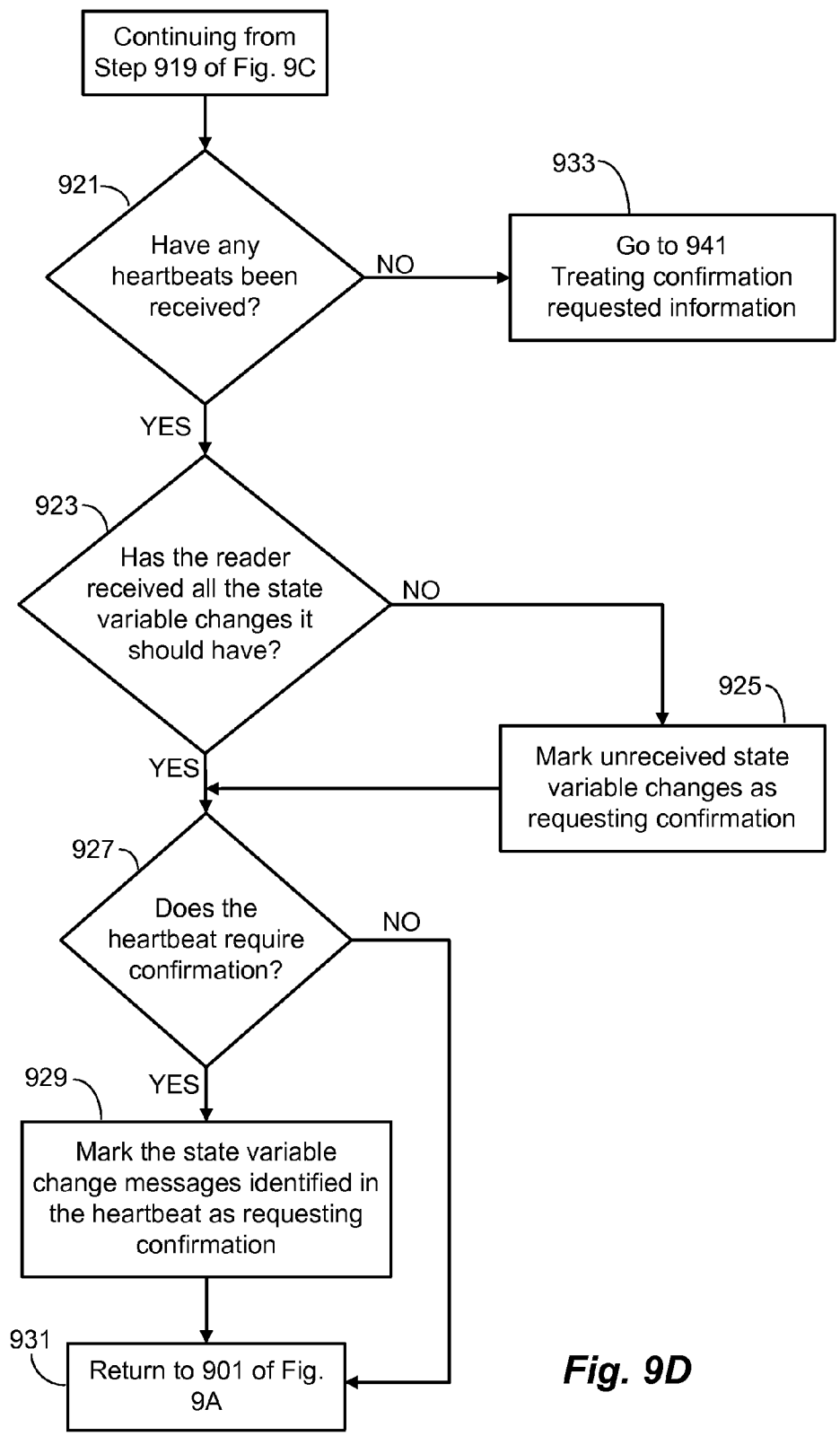

Alternatively, if the reader object has not a received new variable change message, then the process goes to 921 of FIG. 9D to mark messages identified by heartbeat messages as confirmation requested (Step 919). FIG. 9D depicts a portion of the remote writer process corresponding to 905(*b*) of FIG. 9B. The process begins by determining whether any heartbeat messages have been received (Step 921). As previously explained, a heartbeat message identifies the highest Seq. No. message sent by the writer object. If a heartbeat has not been received, confirmation requests are dealt with (Step 933). This portion of the processing (namely, 905(*c*) of FIG. 9B) will be discussed in greater detail below with respect to FIG. 9E. However, if a heartbeat has been received, the processing determines if the reader object has received all the variable change messages it should have (Step 923). This can be accomplished by comparing the Seq. No. of the heartbeat with the Seq. No. of all messages received. For example, if a heartbeat sends Seq. No. 8 that means that messages having Seq. Nos. 1-8 have been sent. If the reader object has also received messages having Seq. Nos. 1-8 that means that the reader object has received all the variable change messages it should have and the process can then proceed to the next Step 927. However, if reader object has not received all the variable change messages, the unreceived change messages are marked as missing (Step 925). This is because a standard heartbeat message informs the reader of the changes it should have received. Thus, the reader can determine that it has missed some of those messages. Once the change messages are marked as missing, the process returns to point 901 of FIG. 9A. (Step 931).

Where the reader has received all the changes indicated in the heartbeat (Step 927), it is determined whether the heartbeat itself requires confirmation (Step 927). If confirmation is not required, then the process returns to point 901 of FIG. 9A

(Step 931). On the other hand, if the heartbeat does require confirmation, then the variable change message having the highest Seq. No. is identified in the heartbeat message and marked as requesting confirmation. The process then returns to point 901 of FIG. 9A. (Step 931).

Figure 9E:
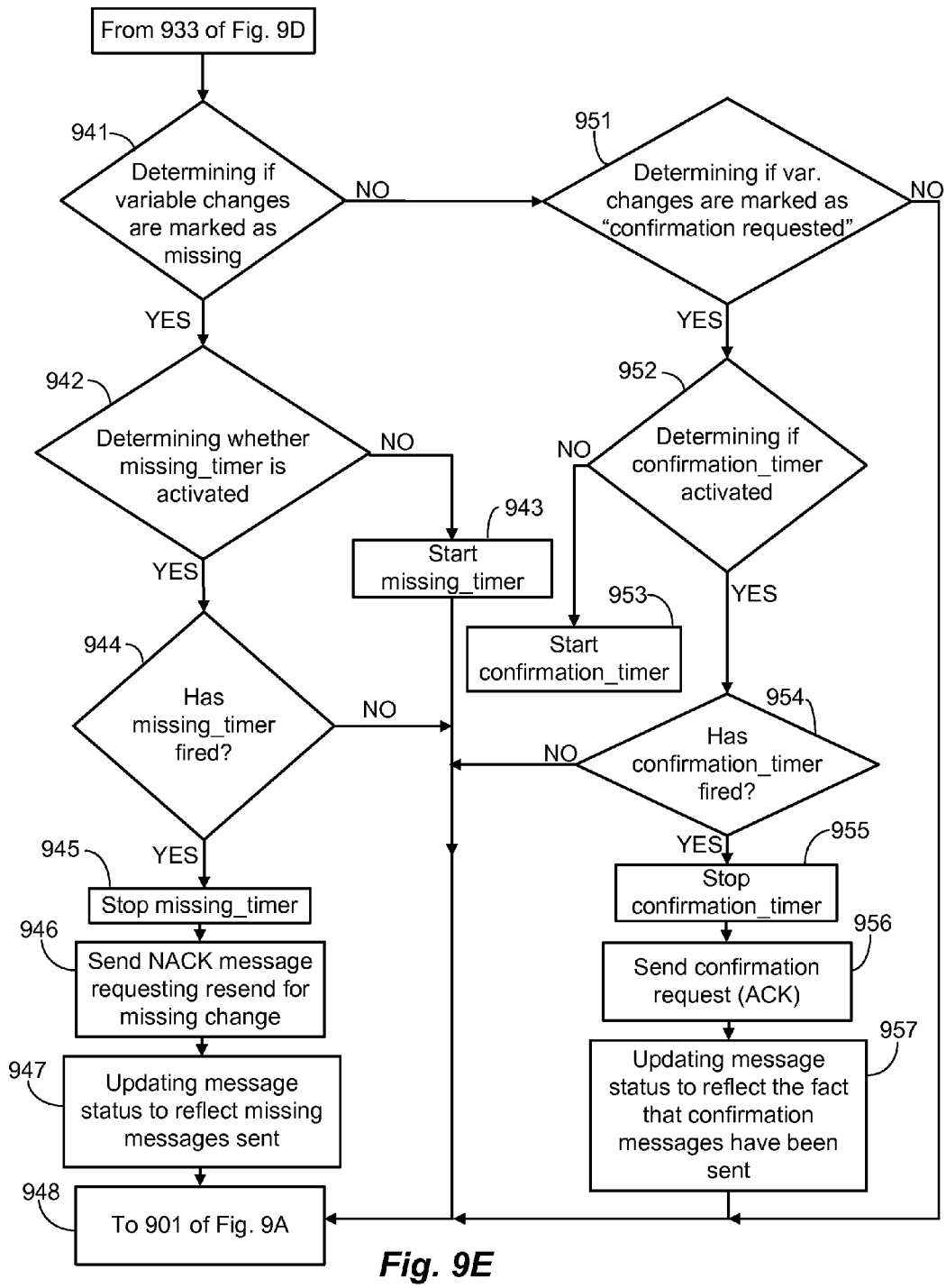

FIG. 9E depicts a portion of the remote writer process identified as Step 905(*c*). The processing sends requests (NACKs) for missing variable changes and confirmations (ACKs) for those variable changes whose confirmation has been requested. The processing begins by determining if there are variable changes that have been identified as missing (typically, identified by Seq. No.) (Step 941). If there are no missing changes, the processing continues with Step 951 which will be discussed later. Otherwise, if there are changes marked as missing, the processing checks to determine whether a fifth timer ("missing_timer") has already been activated (Step 942). If the missing_timer has not been started the processing starts it (Step 943) and goes back to 901 of FIG. 9A (Step 948). On the other hand, if the missing_timer has been started, the processing checks whether it has fired already (Step 944). Where the missing_timer has not yet fired, the processing also returns to 901 of FIG. 9A (Step 948). Where the "missing_timer has fired, the missing_timer is stopped (Step 945) request messages (NACK messages) are sent for the missing changes having the lowest Seq. Nos. (Step 946). At this point the status of messages is updated to reflect the fact that the missing messages have now been sent (Step 947). Then the processing returns to 901 of FIG. 9A (Step 948). It is noteworthy that an NACK can include submessage elements that (described hereinbelow) allow one or more requests to be embedded within a single NACK submessage.

Returning to Step 941, where no changes are marked as missing, the processing proceeds to Step 951 where it is determined if there are changes marked as confirmation requested. If there are no changes marked as confirmation requested, the processing goes to 901 of FIG. 9A (Step 948). Where changes are marked as confirmation requested, the processing checks whether a sixth timer "confirmation_timer" has been started (Step 952). If the timer has not been started, the "confirmation_timer" is activated (Step 953) and the processing returns to 901 of FIG. 9A (Step 948). If the "confirmation_timer" is already activated, the processing determines whether the "confirmation_timer" is activated has fired (Step 954). In the case where the "confirmation_timer" has not fired, the processing returns to 901 of FIG. 9A (Step 948). In the case where the "confirmation_timer" has fired, the processing stops the "confirmation_timer" (Step 955) and sends a confirmation message (ACK) back to the writer that requested the confirmation (Step 956). At this point the status of messages is updated to reflect the fact that messages marked as "confirmation requested" have now been sent confirmation messages (ACK's) (Step 957). The processing returns to 901 of FIG. 9A (Step 948).

The processing described hereinabove describes a process where a reader to sends confirmation messages for particular Seq. Nos. once they have been marked as confirmation requested. In different implementations, the middleware can operate differently. For example, when a change is marked as confirmation requested, the middleware can unmark all changes that were marked "confirmation requested" that have smaller sequence numbers than the current ones. The state of the "confirmation" timer is however preserved so the confirmation will be send on the same schedule as before but with a higher Seq. No. thus saving confirmation messages.

Another useful attribute of the present invention is its ability to self-configure network nodes or applications as soon as they are connected to the network. To this end, each node has a set of built-in Readers and Writers concerning topics useful to the configuration of the nodes. As soon as the node is connected to the network, the RTPS communication protocol automatically assumes the existence of certain built-in readers and writers in a pre-configured set of nodes (given individually as a list or in group manner using multicast or broadcast). It then creates remote readers for the assumed readers on those remote nodes, and uses the writer to reader communication to send and receive information regarding the properties of the node. Properties of the node include, but are not limited to protocol versions, vendor information, source and destination hostnames, IP addresses, pathnames, communication ports. The built-in readers and writers communicate also the existence of publications, subscriptions and other variables. Using this mechanism, and with the aid of built-in writers that have group objects containing the list of all subscription, publications, variables and other relevant information, the nodes inform each other of topics, readers, writers, and other things they can publish or subscribe to. This permits each node to set itself up without the need for a network administrator to do it manually.

Figure 11:
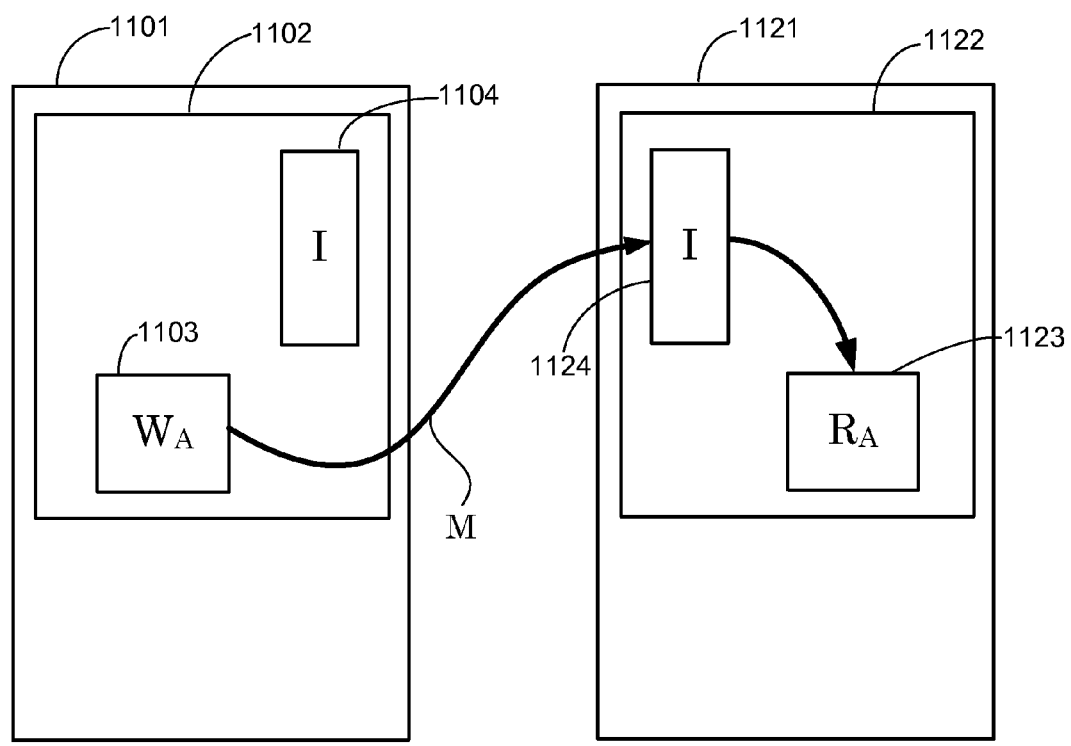
FIG. 11 is diagram illustrating the communication between two nodes of a real-time network in accordance with the principles of the present invention.

FIG. 11 is a simplified block diagram that illustrates the communication from one node to another. A first node 1101 is schematically depicted having RTPS middleware 1102, a Writer ($W_A$) 1103, and a Message Interpreter 1104. The Writer ($W_A$) 1103 publishes information about variable A. A second node 1121 is connected to the same real-time network (not shown) as the first node 1101. The second node 1121 includes RTPS middleware 1122, a Reader ($R_A$) 1123, and a Message Interpreter 1124. The Reader ($R_A$) 1123 is interested in receiving variable messages about variable A. In the depicted embodiment, a message M is communicated from the Writer $W_A$ to the Reader $R_A$. Before the Reader $R_A$ can read the message it must be interpreted by the Message Interpreter 1124.

In order to be correctly interpreted by the Message Interpreter 1124 the messages should comply with some standardized format. Although many formats can be used, one message format embodiment will be detailed hereinbelow. Items like data must be encoded. In one suitable implementation data is encoded using OMG CDR (See, The Object Management Group "CDR data representation", http://www.omg.org/corba/corbiiop.htm, August 1998). Such CDR data representation encapsulates data using the native order and the endianess of the sending machine and leaves correct interpretation up to the receiver. Seq. Nos. are encoded using 64 bits. Timestamp information uses standard NTP representations of time (Internet Engineering Task Force (IETF) RFC 1305 "Network Time Protocol (Version 3) Specification, Implementation and Analysis". See, http://www.ietf.org/rfc/rfc1305. txt). The objects on the network can be uniquely identified using 12 octet Global Unique Object ID's (GUID). The GUID is built of three components (HostId, ApplicationId, ObjectId) each comprising a 4-octet data stream. Such identifiers can be constructed using the UUID specification from OSF/DCE (See, The Open Call Group Document C706, "CDR 1.1: Remote Procedure Call" see, http://www.opengroup.org/publications).

Figure 12A:
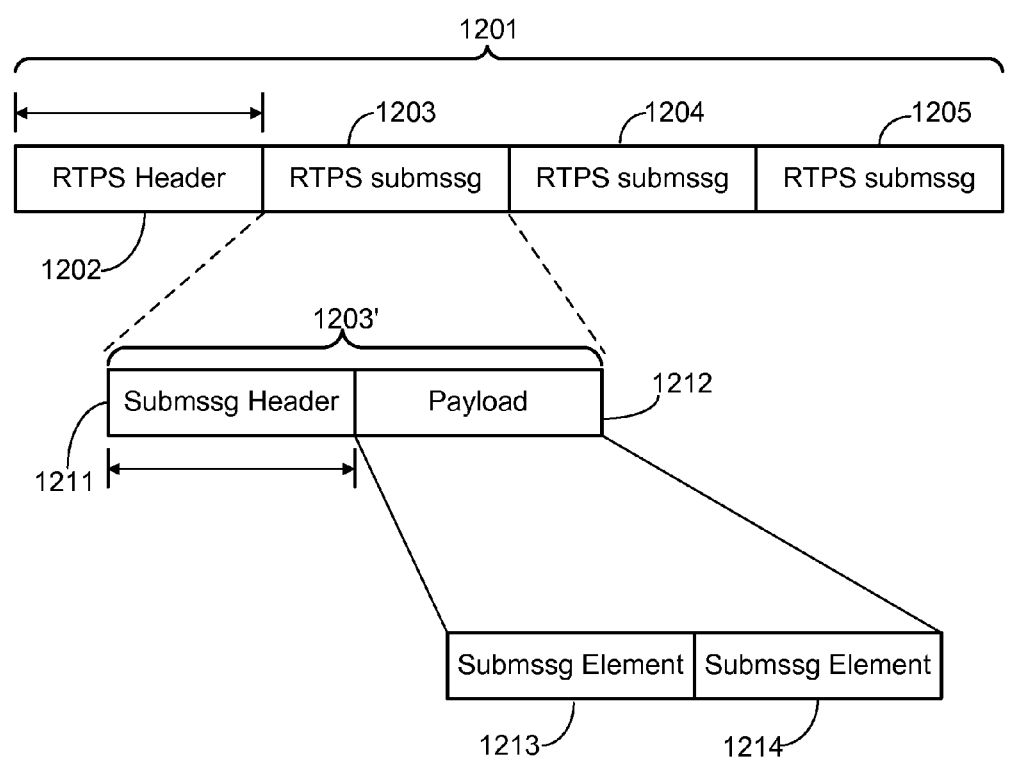
FIGS. 12A-12G are block diagrams of example RTPS message embodiments in accordance with the principles of the present invention.

Using these formats, a modular message format can be constructed that allows the use of small set of well known and readily understood submessages to communicate information in accordance with the real-time communication protocol of the present invention. FIG. 12A illustrates a typical RTPS message suitable for use with the RTPS communication protocol of the present invention. In one implementation, when UDP/IP is used, a RTPS message is the contents of one UDP/IP Datagram. A RTPS message 1201 includes an RTPS header 1202 followed by a variable number of RTPS submessages 1203, 1204, 1205. A more detailed view 1203' of an RTPS submessage shows a RTPS submessage header 1211 and RTPS submessage payload 1212. The RTPS submessage payload 1212 is comprised of a variable of submessage elements 1213, 1214. Each of these components of an RTPS message will be briefly explained.

Figure 12B:
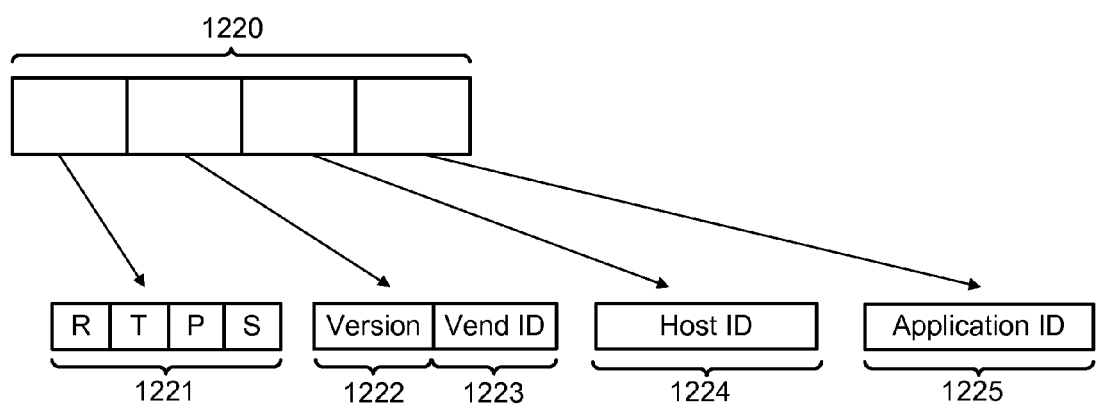

FIG. 12B is a block diagram of a RTPS message header. A RTPS message header 1220 is comprised of 16 octets. The first four octets comprise the RTPS header 1221 containing octets that spell the characters "R", "T", "P", "S" using the ASCII encoding. These first four octets 1221 enable the Message Interpreter to discriminate between other messages and identify the message as an RTPS message. If the message is not an RTPS message the protocol will skip the message. The next two octets 1222 identify the RTPS protocol version. In protocol version one these two octets are set at values of 1 and 0 respectively. The next two octets 1223 identify the vendors of different providers of protocol implementations. The next four octets 1224 identify the host sending the message by using an identifier that uniquely identifies the host on the network. The last four octets 1225 identify the application sending the message by using an identifier that uniquely identifies the application on the host.

Referring again to FIG. 12A, the RTPS message 1201 further includes a variable number of RTPS submessages 1203, 1204, 1205. Each RTPS submessage includes a RTPS submessage header 1211 and RTPS submessage payload 1212 comprised of one or more RTPS submessage elements 1213, 1214.

Figure 12C:
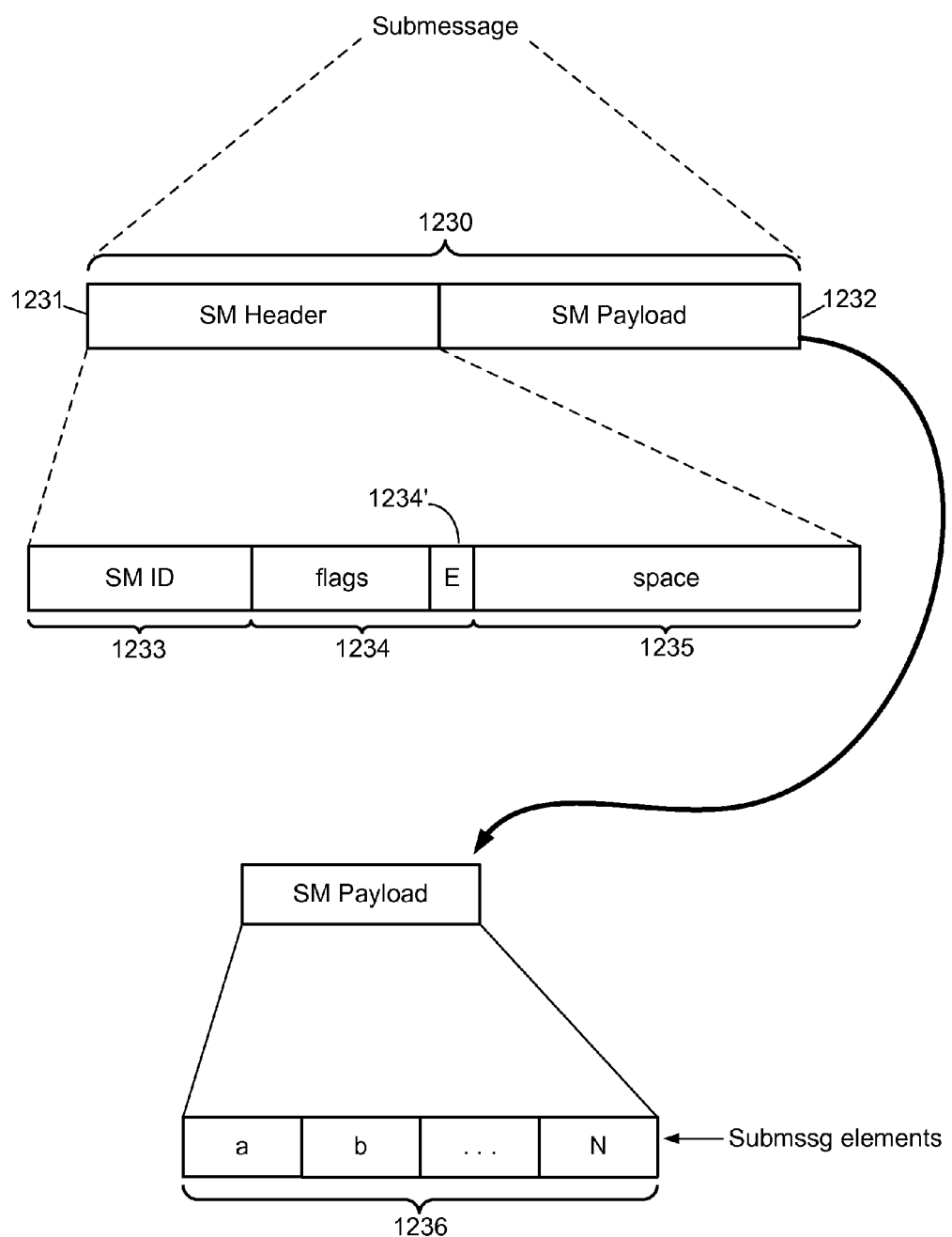

FIG. 12C is a more detailed description of the aforementioned components of a RTPS submessage. In the depicted embodiment, a RTPS submessage 1230 includes the RTPS submessage header 1231 and RTPS submessage payload 1232. In the depicted embodiment, a four octet RTPS submessage header 1231 includes a one octet (8 bit) submessage identifier 1233 that tells the Message Interpreter what is in the RTPS submessage followed by eight bits of flags 1234 including an endianess identifier 1234'. These are followed by a short 16-bit encapsulation of the number of octets to skip 1235 to arrive at the next RTPS submessage header in the data stream. In this way if the Message Interpreter does not understand a particular submessage identifier 1233 (or anything within the submessage payload), that one submessage can be skipped. This will allow introduction of new submessages in future versions of the protocol while maintaining interoperability with the older versions which will simply skip submessages they cannot understand. Typical examples of such submessage identifiers 1233 are VAR messages, which indicate that the message contains information about a variable. Commonly, this can be data values. Another submessage identifier 1233 is a GAP submessage, which as explained earlier, indicates that a range of Sequence Numbers (Seq. Nos.) are no longer relevant. Similarly, ACK and NACK submessages can be identified. Heartbeat submessages can be identified. Submessages modifying destination (INFO_DST) can be identified. Submessages that change the context of the Message Interpreter and thus affect the interpretation of the messages that follow it can be identified. Examples of such submessages include, but are not limited to submessages containing explicit information as to where to send replies (INFO_REPLY), submessages modifying the source of the following submessages (INFO_SRC), submessages that send timestamps for the following submessages (INFO_TS), submessages that send issues from a publication to a subscription in the following submessages (ISSUE). Even submessages that identify the following submessages as having no meaning (PAD) can be identified. The submessage header 1231 is followed by a variable number of RTPS submessage elements 1236 (depicted here as a, b, . . . N).

Figure 12D:
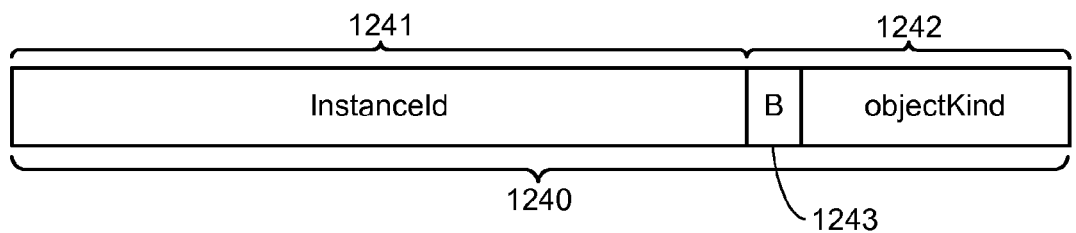

FIGS. 12D-12G depict a few representative RTPS submessage elements. FIG. 12D depicts a four octet Object Identifier element 1240. The first three octets identifying the object instance 1241, and the last octet identifying the kind of object 1242. One bit 1243 can be used to identify whether the object is a built-in object.

Figure 12E:
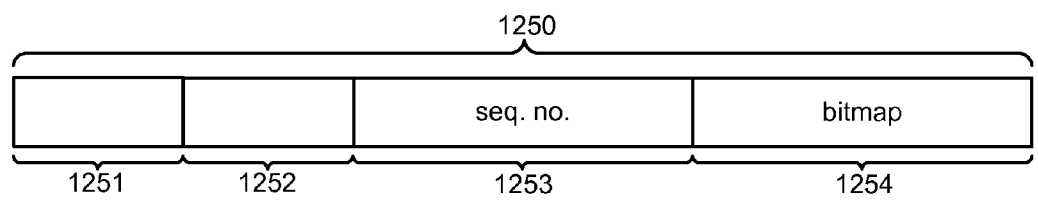

FIG. 12E depicts a RTPS submessage element for a GAP message 1250. This embodiment depicts a GAP message. The first four octets 1251 identify the Reader of the message (typically by GUID). The second four octets 1252 identify the Writer for whom the message is intended (also, typically by GUID). The next eight octets 1253 are used to identify the beginning Seq. No. for which the GAP submessage applies. The final octets 1254 comprise a bitmap that is used to identify the individual Seq. Nos. for which the GAP submessage element applies. An example of how this might work is illustrated as follows. A first Seq. No. is identified as "12" and the bitmap has an initial sequence number equal to "17" and has 6 bits with values 001101 (this bitmap can be represented in a more compact form as 17/6:001101). The GAP submessage has the following interpretation. The gap changes include an interval starting at Seq. No. "12" and ending at "16" (i.e.; 16=17−1). Further, there are additional gaps indicated by the corresponding bits in the bitmap being set to '1'. The first bit on the bitmap is correlated with the sequence number in the bitmap (17 in this case), thus for this particular example there is a gap interval from Seq. Nos. 12 to 16 (both included) followed by individual gaps at Seq. Nos. 19, 20, and 22. This yields a GAP list with Seq. Nos.={12, 13, 14, 15, 16, 19, 20, 22}. Many other types of message elements can be similarly formatted. Examples include, but are not limited to, heartbeats and acknowledgements. Shorter submessage elements can be used for PAD's, Timestamps, and Sequence Numbers.

Figure 12F:
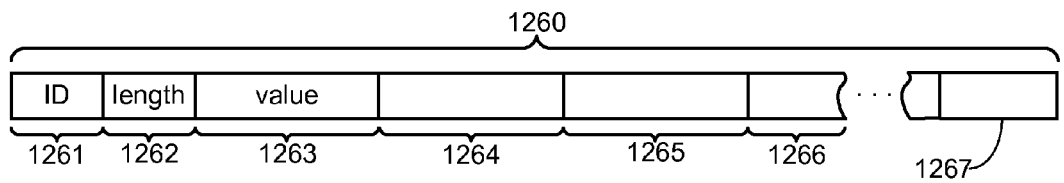

FIG. 12F depicts a submessage element used to encapsulate the properties of RTPS communication objects (e.g., Readers, Writers, Message Interpreters, etc). Such a RTPS Parameter Sequence 1260 is a sequence of parameters that characterize the properties of the particular communication object and terminate in a sentinel. The first two octets 1261 identifies the parameter, the second two octets 1262 define the number of octets in the value of the parameter. This is followed by a value of the parameter itself 1263 aligned to a 4-octet boundary. The next parameter follows with similarly constructed parameter identification 1264, parameter length specification 1265, parameter value 1266. This continues until all parameter information is specified. Then the submessage element terminates with a sentinel 1267. This representation allows new parameters to be introduced in later revisions of the protocol without breaking backwards compatibility.

Figure 12G:
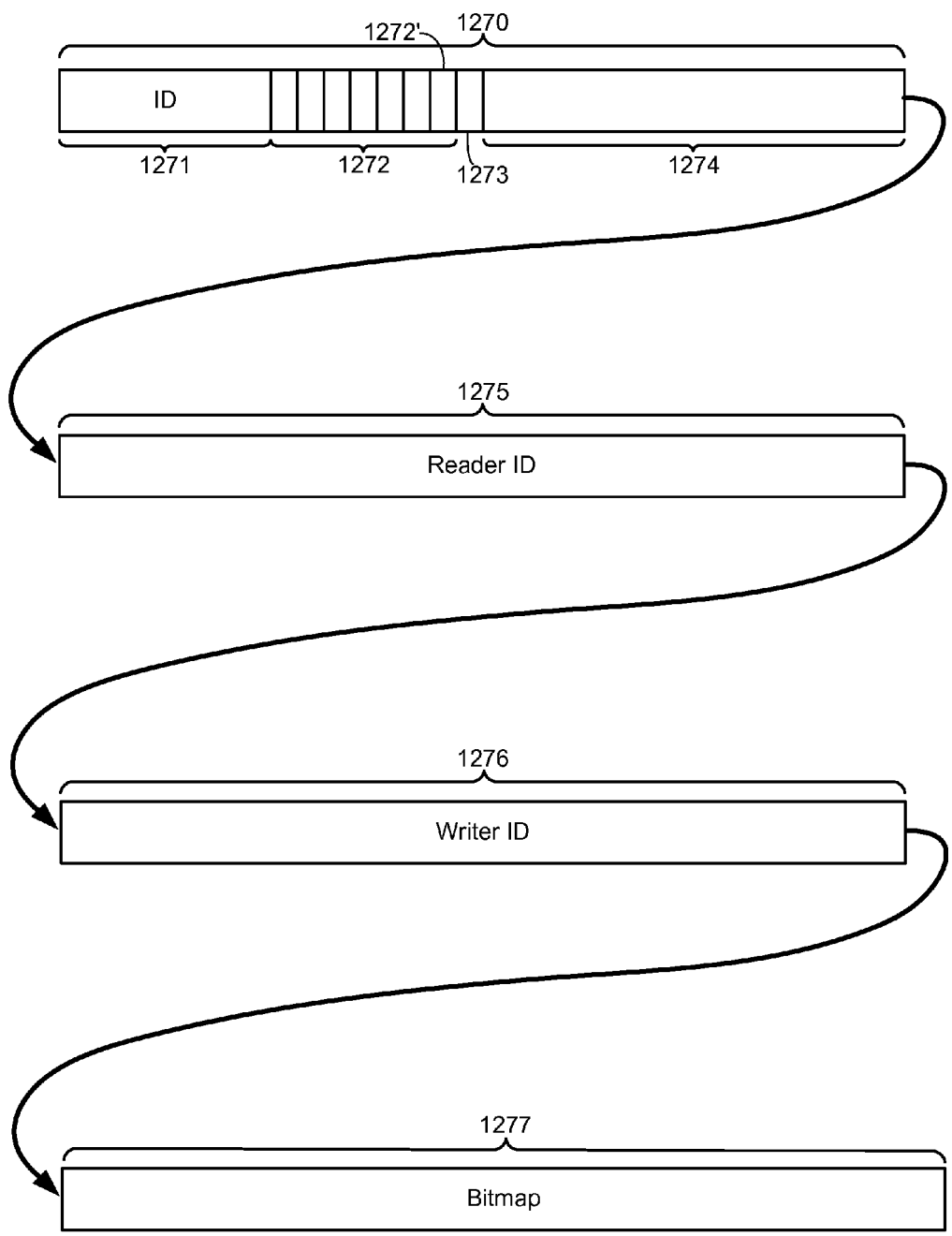

FIG. 12G is a RTPS message that includes submessage elements for an ACK submessage. The first four octets 1270 are the submessage header for the ACK message. The first octet 1271 identifies the message as an ACK message. The next seven bits 1272 are flags. If the final bit 1272' of the seven bits 1272 is set, then the ACK does not require a response. As explained above, the last bit 1273 of the second octet identifies endianess. The next two octets 1274 identify the number of octets to the next submessage header. This is followed by a four octet submessage element 1275 that identifies the Reader of the message (typically by GUID). The next four octets 1276 identify the Writer for whom the message is intended (also, typically by GUID). This is followed by a variablesized submessage element 1277 comprising a bitmap that is used to identify the individual Seq. Nos. for which the ACK submessage element applies. This bitmap works similarly to the bitmap described above with respect to the "GAP" message. In addition to RTPS submessage elements disclosed above, many other submessage elements may be constructed when taken with the teachings herein.

An advantage to the above-described message format is that a single submessage can be used to control the context of the interpreter and thus affect the interpretation of an entire stream of related submessages. Because this information is cached by the Message Interpreter, the information only needs to be sent once per message and does not need to accompany each submessage as is often conventionally required. Furthermore, the use of globally-unique object identifiers (GUID) to identify source and destination of many submessages, allows readers and writers to remember information previously conveyed by that same reader and writer. This information pertaining to, for example, the properties of the Reader or Writer does not need to be sent along with each message they exchange as is often conventionally required. These two attributes reduce message (and submessage) size having the result that network message traffic is reduced.

The present invention has been particularly shown and described with respect to certain preferred embodiments and specific features thereof. However, it should be readily apparent to those of ordinary skill in the art that various changes and modifications in form and detail may be made without departing from the spirit and scope of the invention as set forth in the appended claims. Although the disclosed system is particularly suitable for real-time applications, the inventors contemplate that its attributes and characteristics are also well suited for use with conventional publish-subscribe systems. Furthermore, the examples provided herein are intended to be illustrative rather than limiting. The inventions illustratively disclosed herein can be practiced without any element which is not specifically disclosed herein.

We claim:

1. A real-time protocol executable on a computer network having a plurality of nodes, wherein the nodes include real-time middleware capable of executing real-time operations, the middleware of each node further including:
    a write object associated with a variable;
    a read object associated with a variable;
    a message interpreter that receives and interprets the variable change messages so that they can be read by a read object;
    a variable reference table which a write object uses to track variable information;
    a remote reader reference table for each reader that has registered to receive information from the writer so that the writer can determine a message status for each reader registered to receive information from the writer, wherein
    a variable is a data object that includes a plurality of parameters and a plurality of associated parameter values,
    a variable includes parameters for a globally unique identifier and, implicitly or explicitly, a type and a topic; and
    the write object is capable of writing variable change messages having a topic to associated read objects that are registered to receive variable change messages having the topic, without the read communication objects otherwise requesting the change information.

2. The protocol of claim 1 wherein variable change messages are sent from write objects to read objects, wherein the variable change messages include header information that is cached by the message interpreter so the header information need not be included in every message.

3. The protocol of claim 1 wherein variable change messages are sent from write objects to read objects, wherein the variable change messages include information about the properties of a variable that are cached by the middleware at the receiving end so that the properties of the variable need not be sent with every change message.

4. The protocol of claim 1 wherein variable change messages are sent from write objects to read objects, wherein the variable change messages include information about the properties of a write object that are cached by the middleware at the receiving end so that the properties of the write object need not be sent with every change message.

5. The protocol of claim 1 wherein messages are sent that include submessages that change the context of the message interpreter at a receiver end and thus affect the interpretation of subsequent submessages so that the context information need only be included once in the message and not with every submessage.

6. The protocol of claim 1 wherein variable change messages are sent from write objects to read objects, wherein the variable change messages include submessages and submessage header information that is cached by the message interpreter so the submessage header information need not be included in every submessage.

7. A real-time publish-subscribe (RTPS) message format for use on a real-time computer network where the RTPS messages are sent between communication objects, wherein the communication objects include write communication objects and read communication objects the communication objects are associated with variables, a variable is a data object that includes a plurality of parameters and a plurality of associated parameter values, and a variable includes parameters for a globally unique identifier and, implicitly or explicitly, a type and a topic;
    wherein the read communication objects are configured to register with the write communication objects to receive information concerning topics for which those write communication objects have variable information; and
    each write communication object is configured, in response to change information regarding the variable information for a topic, to cause the change information regarding the variable information for that topic to be provided to those read communication objects registered to receive information for that topic without the read communication objects otherwise requesting the change information,
    each RTPS message comprising:
    a modular message format having a RTPS message header of a uniform length;
    a variable number of RTPS submessages where each RTPS submessage includes
        a RTPS submessage header of uniform length; and
        a RTPS submessage payload comprised of a variable number of RTPS submessage elements.

8. A real-time publish-subscribe (RTPS) message format as in claim 7, wherein the RTPS message header includes:
    a RTPS header that identifies the message as a RTPS message;
    a version identifier that identifies a RTPS protocol version being used by a message sender;
    a vendor identifier that identifies a vendor for the RTPS protocol version being used by the message sender;
    a host identifier that identifies the node sending the RTPS message; and an application identifier that identifies the application sending the RTPS message.

9. A real-time publish-subscribe (RTPS) message format as in claim 7, wherein the RTPS submessage header includes:
- a submessage identifier that enables a Message Interpreter to determine the contents of the RTPS submessage;
- at least one flag, including an endianess identifier that enables the Message Interpreter to determine the endianess of the RTPS submessage; and
- a submessage-length field identifying the number of octets to the next RTPS submessage header in a data stream, thereby permitting the Message Interpreter to skip over RTPS submessages it does not understand.

10. A real-time publish-subscribe (RTPS) message format as in claim 7, wherein the RTPS submessage element can include an Object Identifier that identifies the object instance and the kind of object that is sending the submessage.

11. A real-time publish-subscribe (RTPS) message format as in claim 7, wherein the RTPS submessage element includes:
- a reader identifier that identifies the reader of the message using a Global Unique Object Identifier (GUID);
- a writer identifier that identifies the writer of the message using a Global Unique Object Identifier (GUID);
- a sequence identifier that identifies the beginning sequence number for which the submessage element applies; and
- a bitmap that is used to identify the individual sequence numbers for which the submessage element applies.

12. A real-time publish-subscribe (RTPS) message format as in claim 7, wherein the RTPS submessage element is used to encapsulate the properties of a RTPS communication object and includes:
- a parameter identifier that identifies a communication object parameter;
- a size identifier that defines the number of octets in a value for the communication object parameter;
- a value for the communication object parameter; and
- a sentinel that terminates the submessage element.

13. The real-time publish-subscribe (RTPS) message format of claim 12, wherein the RTPS submessage element is used to encapsulate the properties of a RTPS communication object enables a Message Interpreter to skip parameters that it does not recognize and process a remaining portion of the submessage.

14. The real-time publish-subscribe (RTPS) message in claim 13, wherein the RTPS submessage element is used to encapsulate the properties of a RTPS communication object enables new parameters to be added in future versions of the protocol and still remain interoperable with versions of the protocol that do not recognize the newer parameters.

15. A real-time publish-subscribe (RTPS) message format as in claim 7, wherein the RTPS submessage element can include an Object Identifier that identifies an object instance and the kind of object that is meant to receive the submessage.

* * * * *